(12) United States Patent
Storelli

(10) Patent No.: US 6,955,005 B2
(45) Date of Patent: Oct. 18, 2005

(54) SCROBICULATE AND OTHER FISHING FLOATS, DEMOUNTABLY ATTACHABLE FISHING LURES AND KITS FOR ASSEMBLING THEM

(76) Inventor: John Storelli, 631 NE. 18$^{th}$ Ave., Ft. Lauderdale, FL (US) 33304

( * ) Notice: Subject to any disclaimer, the term of this patent is extended or adjusted under 35 U.S.C. 154(b) by 0 days.

(21) Appl. No.: 10/208,032

(22) Filed: Jul. 31, 2002

(65) Prior Publication Data

US 2003/0233783 A1 Dec. 25, 2003

Related U.S. Application Data

(63) Continuation-in-part of application No. 09/770,199, filed on Jan. 29, 2001, now abandoned, which is a continuation of application No. 08/777,480, filed on Dec. 30, 1996, now Pat. No. 6,237,276.
(60) Provisional application No. 60/331,777, filed on Nov. 21, 2001, and provisional application No. 60/308,586, filed on Jul. 31, 2001.

(51) Int. Cl.$^7$ .......................... A01K 97/00; A01K 93/00
(52) U.S. Cl. ....................................... 43/43.15; 43/43.1
(58) Field of Search .............................. 43/43.1, 43.15, 43/42.37

(56) References Cited

U.S. PATENT DOCUMENTS

| | | | | | |
|---|---|---|---|---|---|
| 1,991,253 A | * | 2/1935 | Kerns | ...................... | 43/43.15 |
| 2,456,254 A | * | 12/1948 | Rocco | ...................... | 43/43.15 |
| 2,543,293 A | * | 2/1951 | Leitch et al. | .............. | 43/43.16 |
| 2,710,480 A | * | 6/1955 | Gehrig | ...................... | 43/43.15 |
| 2,753,650 A | * | 7/1956 | Rentz et al. | ............... | 43/42.33 |
| 3,221,434 A | * | 12/1965 | Moore | ........................ | 43/42.02 |
| 3,364,614 A | * | 1/1968 | Huebotter | ................. | 43/43.15 |
| 3,372,508 A | * | 3/1968 | Maglinger | ................ | 43/43.15 |
| 3,841,013 A | * | 10/1974 | Sabagonis | ................ | 43/43.15 |
| 6,237,276 B1 | * | 5/2001 | Storelli | ..................... | 43/43.15 |

FOREIGN PATENT DOCUMENTS

| | | | | | |
|---|---|---|---|---|---|
| CH | 278 853 | * | 2/1952 | ............... | 43/43.15 |
| CH | 585 504 | * | 3/1977 | ............... | 43/43.15 |
| NO | 108 316 | * | 3/1966 | ................ | 43/43.1 |

* cited by examiner

Primary Examiner—Kurt Rowan
(74) Attorney, Agent, or Firm—The Barthet Firm; Alexander Barthet

(57) ABSTRACT

A counterweighted weedless fishing float suitable for suspending at least part of an attractant, such as live bait or an insect replica, above the surface of water in which the float is borne, and kits for assembling a variety of attractants, are provided. The float is counterweighted, and may comprise a plurality of air-trapping channels arranged within it to trap an amount of air sufficient to support the float and a connected attractant. In other embodiments, the float may comprise one or more sealed chambers to provide buoyancy. The float may be disguised as a water plant, fallen tree leaf, twig or other floating detritus or water creature. The attractant may replicate an insect such as a dragonfly, an insect larva such as a hellgrammite, or any other natural or artificial fish bait or prey. The float includes an adjustable stem so that the relative position of the attractant or bait with respect to the float and the water surface may be changed depending on the particular fish sought or the conditions present. In one form, the specific gravity of the invention may be adjusted by adding weights to vary its floating characteristics.

1 Claim, 29 Drawing Sheets

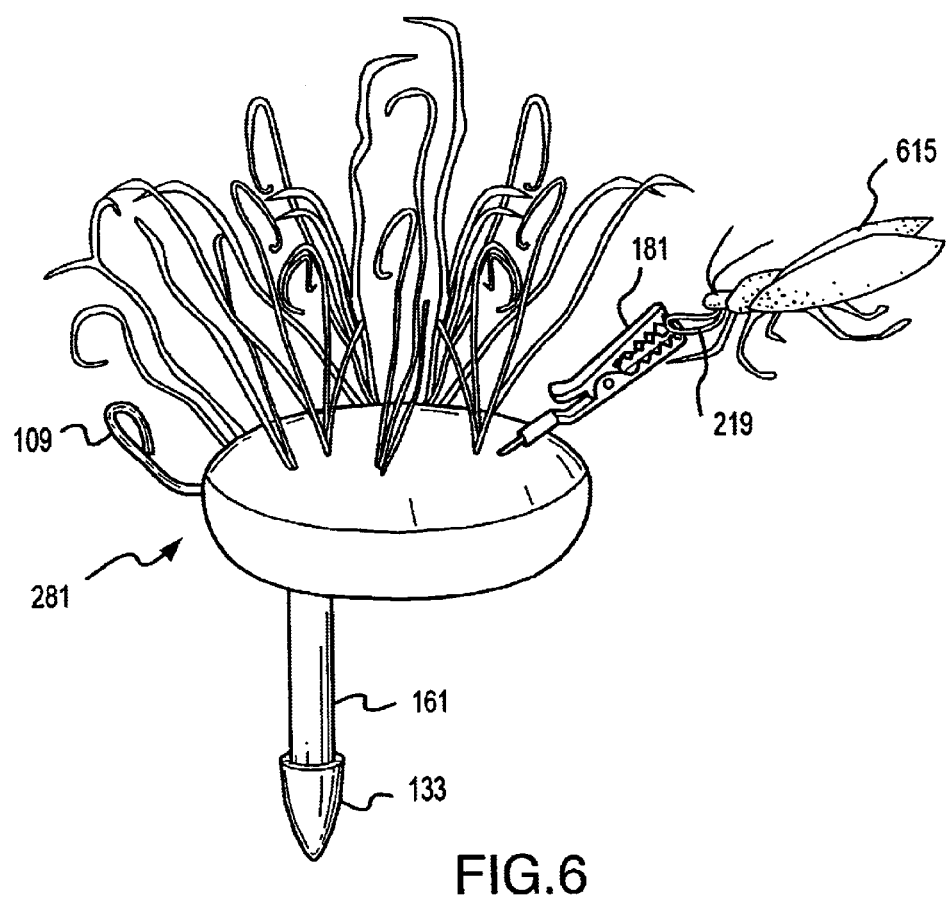
FIG.6
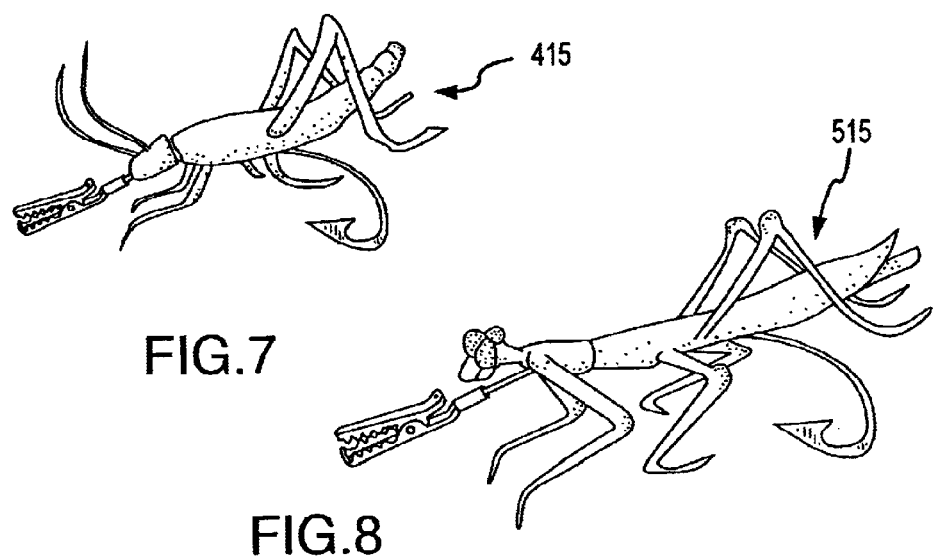
FIG.7
FIG.8

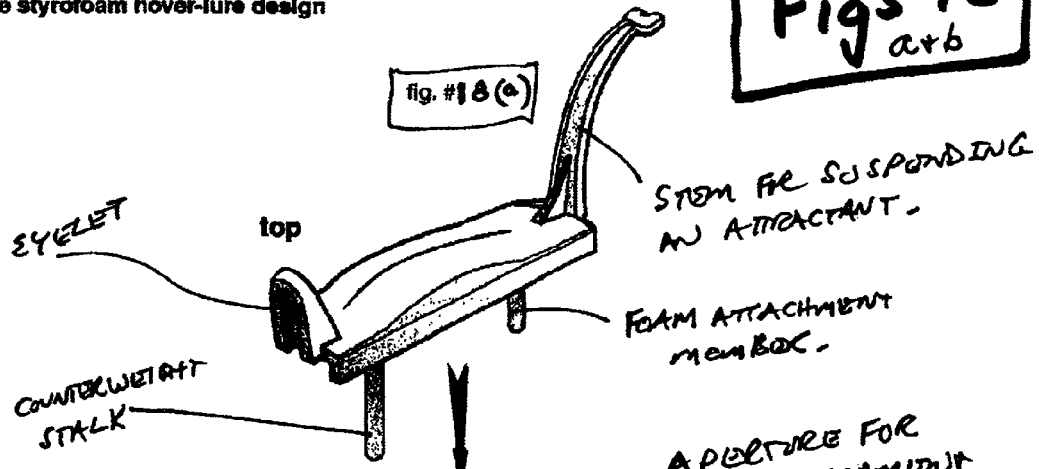
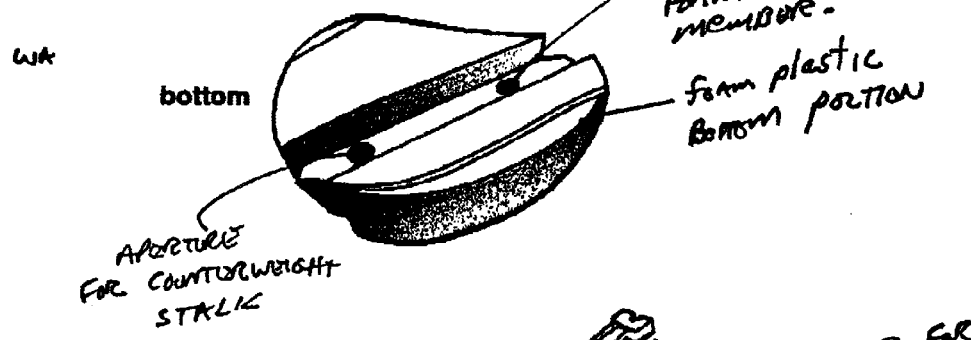
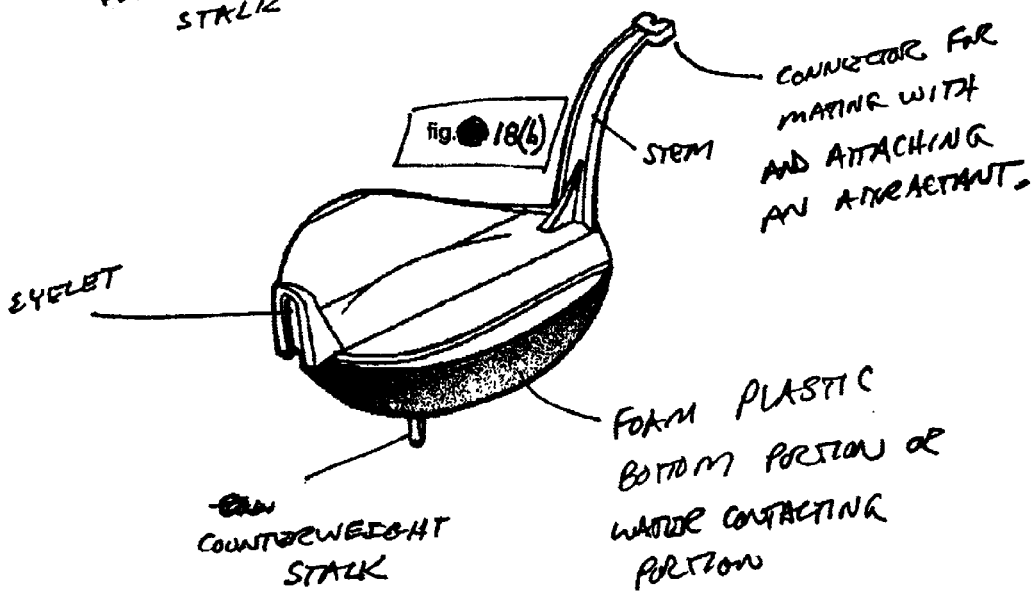

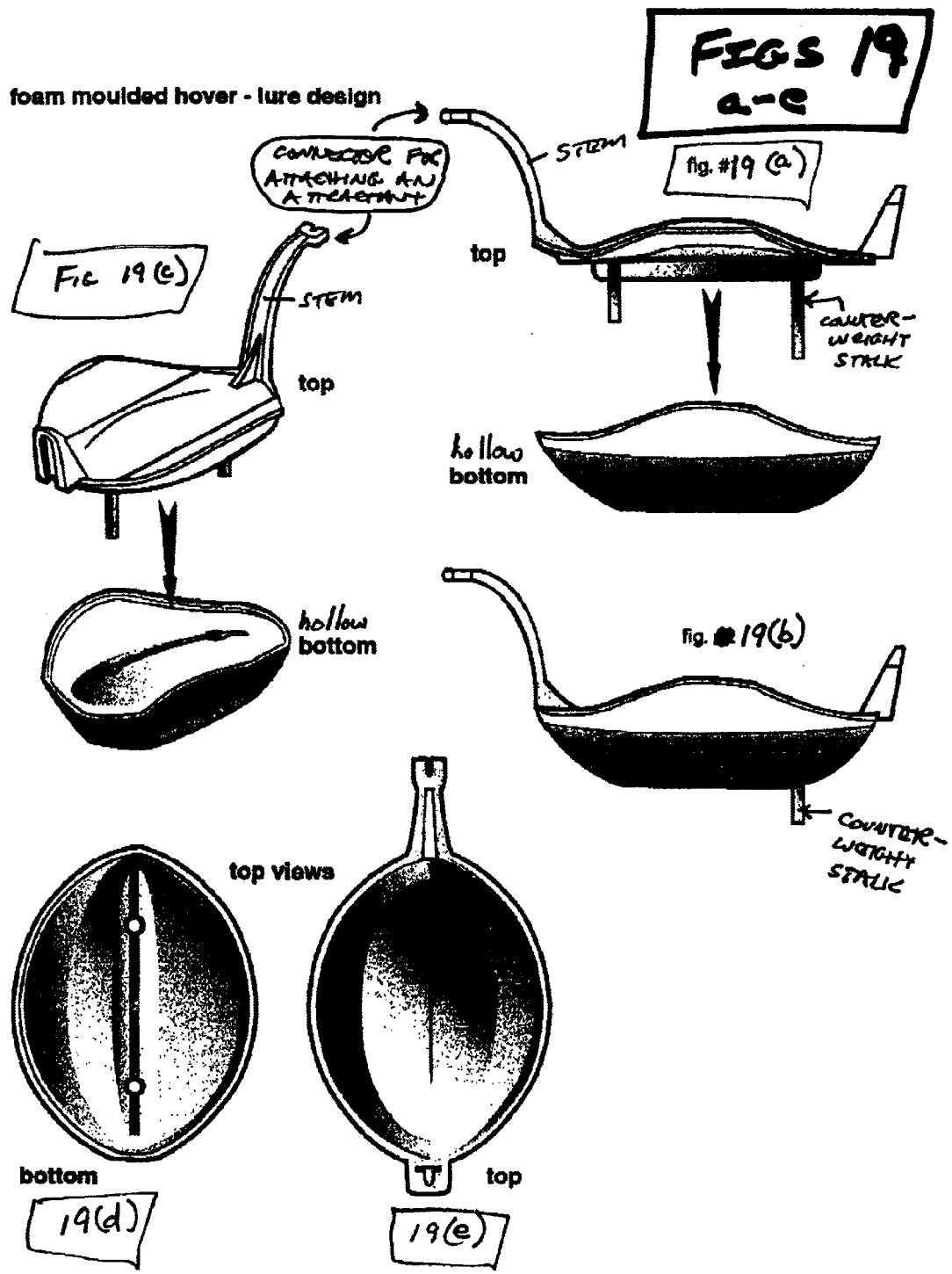

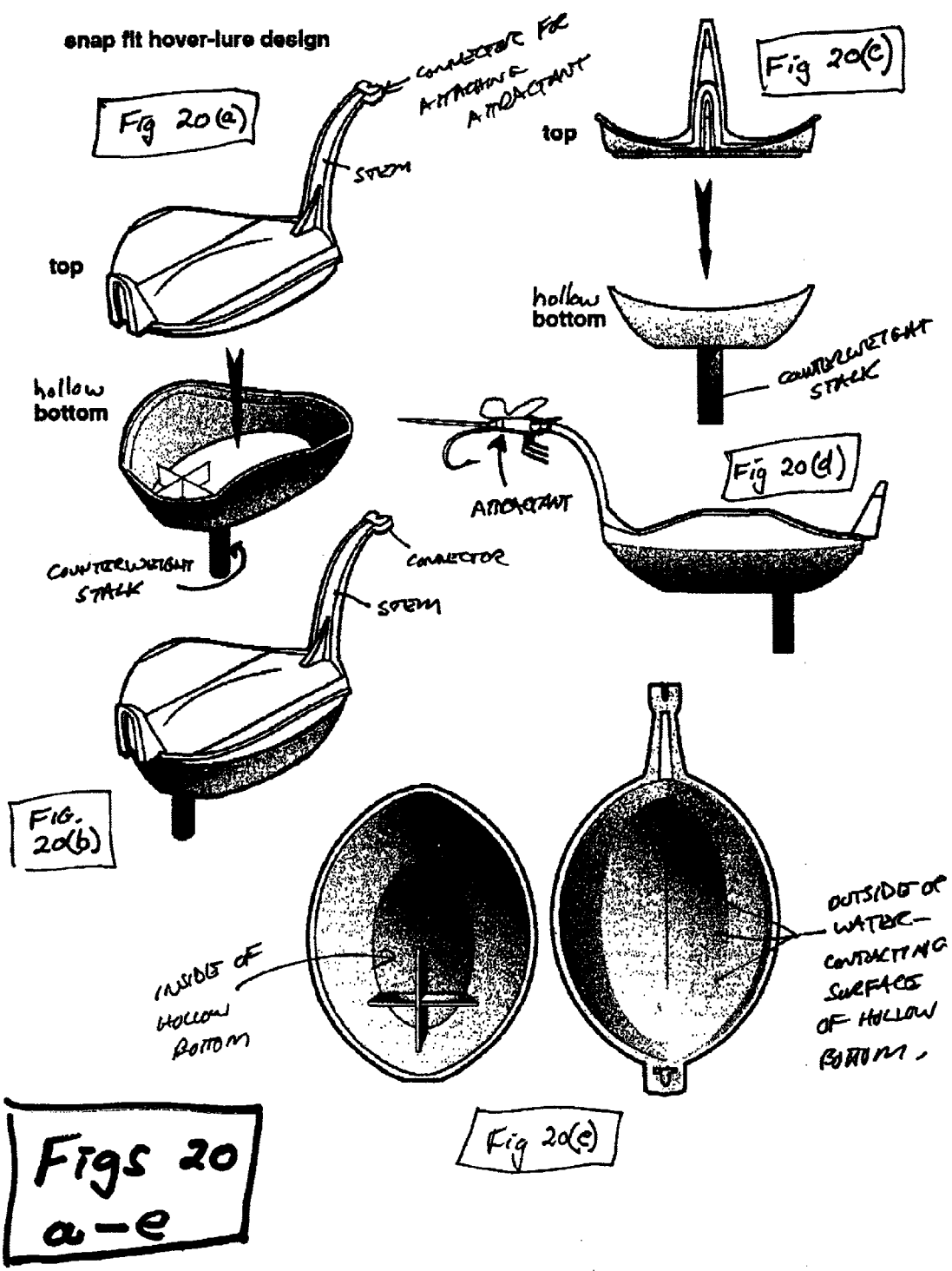

SCROBICULATE AND OTHER FISHING FLOATS, DEMOUNTABLY ATTACHABLE FISHING LURES AND KITS FOR ASSEMBLING THEM

The present application is a Continuation-In-Part of U.S. patent application Ser. No. 09/770,199, filed Jan. 29, 2002, now abandoned, which is a Continuing Patent Application of U.S. patent application Ser. No. 08/777,480, filed Dec. 30, 1996, now U.S. Pat. No. 6,237,276, and of Provisional U.S. Patent Application No. 60/331,777, filed Nov. 21, 2001, and of Provisional U.S. Patent Application No. 60/308,586, filed Jul. 31, 2001. All of the above-identified applications are hereby incorporated by reference and priority is claimed to them.

FIELD OF THE INVENTION

The present invention relates to fishing lures that are water-borne by means of a float, and more particularly to floats that suspend a fishing lure or other fish attractant at least partially above water while simultaneously minimizing the chances of entanglement in water-borne plants or debris. The present invention relates also to kits for assembling such lures and floats.

BACKGROUND OF THE INVENTION

The present invention relates to fishing floats that can be used as platforms for attaching one or more different kinds of attractants, to float-lure combinations, and to kits for assembling the lures, floats, and float-lure combinations. The present invention relates also to a series of fishing floats that include a clip, one or more spiral attachment devices, or a clip combined with a spiral attachment device for attaching or demountably attaching one or more fishing lures or attractants, including natural baits. Such attractants include, for example, natural baits such as grasshoppers, flies, dragonflies, grubs, larvae, worms or other echinoderms, leeches, and replicas thereof.

Fishing lures have various features directed toward minimizing or eliminating snags in water-borne weeds or debris. For example, U.S. Pat. No. 5,107,615 to Shaffer discloses a lure having a hook disposed to lie within a shield so that the point of the hook protrudes through an aperture in the shield to assume a fish catching position only when pressure is applied by the mouth of a fish.

Another common problem relating to water-borne lures is that of presenting an attractant which is borne realistically enough to lure fish efficiently. Numerous approaches have been employed in the art in order to provide a realistic attractant. For instance, some lures are configured to replicate small injured fish, swimming frogs, floating flies, spiders, insect larvae, and numerous other fish prey. An additional problem in the field of fishing lures relates to the efficient use of materials in fabricating and assembling the lures. Thus, it is desirable to have the various elements of the lure, such as the float, and parts that make up the attractant portion of the lure, such as the body and wing parts of the attractant, amenable to manufacturing and assembly processes that use a minimal amount of key materials while enabling an acceptable level of performance of the float, the lure, and their various combinations. However, until the present invention, no lure has provided the advantages of a weedless water-borne lure with those of an attractant which replicates realistically the behavior of fish prey while affording efficiencies of assembly and manufacture, and providing the user with multiple adaptations. Thus, there is a need for floats and lures which provide a realistic attractant combined with a weedless configuration which is still capable of easy manufacture at relatively low material costs.

SUMMARY OF THE INVENTION

In view of these and other needs in the art, and in view of the disadvantages inherent in numerous known types of water-borne lures, the present invention provides embodiments of floats, attractants and their combinations whereby all or part of the attractant portion of the lure is suspended, at least part of the time, above the surface of the water in which the lure is borne to thereby both minimize or eliminate disadvantageous snags and present a realistic attractant and hook to target fish. The interaction between the float and attractant elements of the invention is transmitted through both the connector element and the fishing line to which the attractant, lure or both are attached. Thus, the connector or fishing line transmits the motion or vibration of the float or line to the attractant so that parts of the attractant wiggle or otherwise move and thereby appear to hover or dangle over the water surface. Another advantageous aspect of the present invention is found in the fact that the hook element of the attractant can be disposed to be held above the water surface to thereby avoid snags. The attractant, float or both portions of the present invention may be provided in kit form, that is, in a group or selection of parts such that the parts may be assembled to form a multiplicity of embodiments of any given type of attractant. For example, as is shown in the accompanying figures, parts for assembling multiple permutations or varieties of dragonflies may be presented in kit form for final assembly by the user. Other kit-built attractants are also within the scope of the invention. For instance, parts to assemble other attractants such as grasshoppers, frogs, worms, crustaceans such as crayfish, amphibians such as turtles and salamanders, and damsel flies among other fish prey, are within the scope of the invention. The present invention therefore combines the advantages of an artificial attractant, such as a dragonfly replica, realistically held by the connector and float elements of the invention above, partly above, or dipping into and out of the water surface in which the float-attractant combination is cast, thrown or placed, to thereby appear to hover.

The fishing floats of the present invention can be used to attach fishing flies, live bait, replicas of live bait or any other type of attractant effective for drawing the attention of target fish. Advantageously, fishing floats of the present invention can be made of many different materials including multiple polymers, castable compounds, foam plastics, wood, fiberglass or other composites or any other suitable material that can be molded, machined or otherwise made into a float having a specific gravity of less than 1.0 with respect to water, and thus are capable of suspending an attractant above the surface of water in which the float is placed.

As shown in the accompanying figures, floats of the present invention can be provided with a means for attaching a keel or other weight to thereby ensure that the float comes to be disposed at desired position with respect to the water in which it is floating. Moreover, floats of the present invention can be of various shapes and confirmations depending on the type of environment in which the float will be used. For example, floats of the present invention can be of many different types but are preferably formed to replicate something that would normally be found in a body of water such as leaves, sticks, clumps of grass, lily pads or clumps of spanish moss.

Floats according to the invention can be of varying colors and opacities. For example, the floats can be tinted or molded of colored material, such as green polypropylene to replicate a freshly falling leaf or brown polypropylene to replicate a leaf in some state of decay. In some embodiments, floats of the present invention may be translucent or transparent and comprise the phantom shadow of an attractant disposed on one or more surfaces or facets of the float such that target fish will be attracted by the apparent shadow of their prey.

Demountably attachable attractants are also provided, particularly in kit form, and rotation-resistant hooks of novel shapes that permit the demountable or reversible attachment of an attractant to the hook, or to a float or line to which the hook is attached. Demountable attractants according to the invention can comprise a slot for reversibly receiving a hook having a shaft that is shaped to both prevent its rotation when it is disposed within an attractant body, and engage a positioning notch or dimple in the attractant body such that, once the hook is seated in the attractant body, the barbed end of the hook is disposed for hooking a fish that strikes the attractant, and the attractant is securely mounted on the hook.

In the context of the invention, the term "scrobiculate" means having a plurality of elongated tubes or channels that are closed at least at one end and therefore useful for trapping air and providing buoyancy to a fishing float. The tubes or channels are disposed such that when the lure is cast, thrown or placed into an aqueous medium such as the water in a pond or stream, air is trapped within the channels and provides buoyancy to the float in addition to whatever the float may possess by virtue of the density of the material from which it is made. In some embodiments of scrobiculate floats according to the present invention, some or all of the channels are closed at both ends. In other embodiments of floats according to the invention, the channels are closed at both ends to thereby provide closed pockets of very low specific gravity. The channels may be of any shape and disposition so long as they function to trap a sufficient amount of air, other gas or light material that the float can support itself and an attached attractant at a desired height or degree over or in relation to the water in which they are borne.

In accordance with one aspect of the scrobiculate floats of the present invention, the channels may be parallel cylinders of ovoid or circular cross-section disposed close to one another in bundles or clusters. In other embodiments, the channels can be of any geometric cross-section desired and suitable for a particular use or for particular manufacturing methods or efficiencies. For example, the channels may be square, pentagonal, hexagonal, seven-sided, octagonal, free-formed curves. The channels of a float according to the present invention may be of any diameter or wall thickness so long as they function to provide sufficient flotation for the intended use. Moreover, distances between the channels or groups of channels may be provided such that the desired balance and specific gravity of a particular embodiment are achieved. The channels may similarly be provided in patterns, diameters or densities that achieve the desired balance and amount of floatation necessary, for example, to suspend the weight of a particular attractant a desired distance above a water surface.

As one of skill in the art will understand, the present invention is not limited in its application to the details of construction and to the arrangements of the components set forth in the following description and drawings. The invention is capable of various other embodiments and of being practiced and carried out in various ways. One of skill in the art will also understand that the terminology and phraseology employed herein to describe the present invention are illustrative and not limiting.

In this regard, those skilled in the art will appreciate that the concept upon which the present invention is based may readily be utilized as a basis for the designing of other structures, methods, and configurations for carrying out the several purposes of the present invention. Accordingly, it is important that the claims be regarded as including such equivalent instructions insofar as they do not depart from the spirit and scope of the present invention.

It is therefore an object of the present invention to provide a lure that, when floating in water, provides a platform for levitating or suspending at least part of an attached attractant is held above the surface of the water to thereby eliminate or minimize snags.

In accordance with this and other objects of the invention, a scrobiculate float for use with a fishing attractant is provided. A float according to the invention includes a float body, the float body comprising an upper surface, the upper surface being bordered by an outer margin, a water-contacting surface comprising at least one arc, at least part of the water-contacting surface being disposed opposite the upper surface. In some embodiments, a plurality of channels extends from the water-contacting surface toward the upper surface, the channels being constructed and arranged such that they trap air when the float is cast, thrown or placed into water, and a keel or stalk disposed on or in the float in proximity to the bottom margin, the keel or stalk comprising a counterweight that is disposed such that the float tends to stabilize into a position where the upper surface is disposed upwardly when the float is in water.

The float includes also a connector, such as a stem or arm that extends upwardly from the float and disposed for connecting the float to an attractant, the connector being constructed and arranged such that the attractant is held at least partially above the water in which the float is borne. The float also includes means comprising an aperture, such as an eyelet or loop for receiving a fishing line. The aperture is preferably disposed on the upper surface of the float and away from the connector.

In one method of using a float according to the invention, a fishing line is threaded through the aperture and attached to an attractant comprising a hook that is demountably connected to the connector element of the float. One means of attaching the float and connector is by way of complementary press-fit elements, such as a tab and slot, on the respective parts. Thus, when the attractant is bitten by a target fish, even though the float and attractant may separate, both the attractant and float are still attached to the fishing line for the easy retrieval of both. In accordance with other aspects of the invention, the connector is adjustable with respect to said float so that the relative position of said attractant with respect to said float, and with respect to the water in which said float is borne, is adjustable.

The channels of the scrobiculate floats according to the present invention can be of any dimension so long as they fulfill the desired functions of trapping air or providing stability to the float and attractant in water. In one preferred embodiment of the present floats, the channels are straight and are disposed substantially parallel to one another and substantially perpendicular to the upper surface of the float. In other embodiments, the channels are arcuate. In yet other embodiments of floats according to the present invention, some of the channels are substantially straight and some are arcuate channels.

In embodiments having arcuate channels, the channels may diverge from portions of the upper surface to open at the margins of the water-contacting surface of the float. For reasons of efficiency of manufacture, and economy of materials, channels of the present floats comprise numerous embodiments of dimensions. For example, in cross-section, the channels may approximate any geometric shape and preferably one or more from the group consisting of a circle, an oval, a triangle, a square, a pentagon, a hexagon, a septagon or an octagon. The dimensions of the float channels include a cross-sectional diameter and a longitudinal axis, the axis having an axis length, the cross-sectional diameter having a diametric width and being disposed substantially perpendicular to the longitudinal axis length. Preferably, the diametric width of the channels is within the range of from 1.0 millimeters ("mm") to 20.0 mm, and the ratio of the diametric width to the axis length is between 1:3 and 1:40. Thus, the present invention provides for numerous permutations of channeled floats.

Attractants for use with floats of the invention are numerous, and include not only those described herein in kit form, but assembled attractants available from numerous public sources. Preferably, the attractant used with the present floats replicates one or more from the group consisting of insects, arachnids, amphibians, reptiles, insect larvae, earthworms and other echinoderms, birds, small fish and small animals. Preferably, at least a portion of the attractant comprises at least one element that wiggles or vibrates in relation to other segments of the attractant when force is applied to said lure. An attractant that replicates a dragonfly, and being provided with wings of a lightweight diaphanous or reflective material, such as Mylar brand membrane or acetate film or sheeting, are thought to be particularly suitable for use with the floats of the present invention.

Additional aspects in accordance with the invention include wherein the connector is frangible to the extent that it breaks under the force applied by a striking fish so the attractant is free of the float and the connector, and wherein the specific gravity of the lure is adjustable to thereby control the depth of the float in the aqueous fluid and the height of the hook above the aqueous fluid, and wherein the connector is deformable to the extent that the position of the attractant in relation to the float and the aqueous fluid is adjustable.

In accordance with still other objects of the invention, a snag-resistant fishing lure platform is provided comprising a float, a connector suitable for suspending a hook or an attractant above the surface of a body of water in which the platform is placed, and means for attaching the lure to a fishing line. The various components of the lure according to the invention can be made from materials conventional in the field. For example, the attractant means can be formed of moldable material such as plastics, fabric, metals, wood or other plant products, and fibers, all known in the trade or that may be adaptable to the purpose and spirit of the attractant element of the present invention. Alternatively, the attractant can be any conventional fly, insect, or other fish prey replica known in the art.

In some embodiments of the present invention, a float, connector and means for attaching an attractant to the connector, such as a conventional fly or live bait, are provided. Thus, a user of the invention can tailor it to the specific type of fish being sought or to bait availability due to seasonal changes. The hook element of the attractant is preferably formed from metal as is conventional in the fishing lure art, although it may also be made of fiberglass or other composite materials of sufficient strength and rigidity to form a hooking means.

BRIEF DESCRIPTION OF THE DRAWINGS

FIG. 6 is a side oblique view of a fishing lure according to the invention wherein a counterweighted float is camoflaged as a clump of grass and is provided with a line guide and clip holding an artificial insect lure above water.

FIGS. 7 and 8 show examples of artificial attractants comprising clips according to the invention and thus being suitable for use with many embodiments of the floats of the invention.

FIGS. 18*a* and *b* show one form of a float according to the invention wherein a top portion comprising guide and attachment elements for a fishing line, attractant and counterweight is joined with a bottom portion of plastic foam of very low density.

FIGS. 19*a*–*e* show snap-fit embodiments of a hollow float according to the invention wherein a counterweight stalk extends from a top portion of the float through the bottom portion.

FIGS. 20a–c show snap-fit embodiments of a hollow float according to the invention wherein a counterweight stalk extends from a bottom portion of the float.

DETAILED DESCRIPTION OF THE PREFERRED EMBODIMENTS

Figure 1:
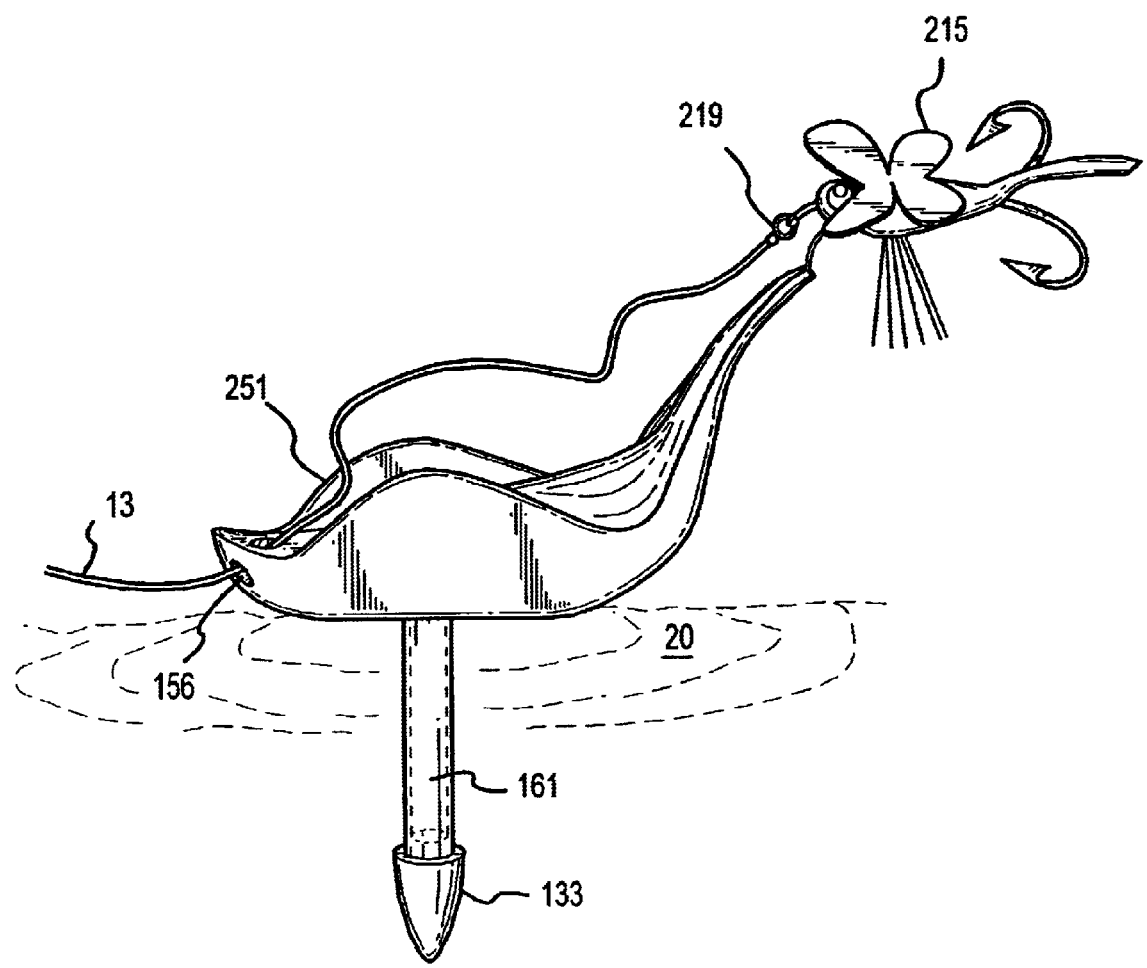
FIG. 1 is an oblique side view of a counterweighted float and attached dragonfly lure and according to the invention and floating in water.

The advantages and characteristics of the levitating bait weedless fishing floats, lures lure kits, and lure-float combinations of the present invention can be elucidated from the following detailed description of multiple embodiments of the invention to be taken as examples and not as limitations in conjunction with the accompanying drawings. From the information disclosed herein, it is also clear that many permutations of the present invention are possible by combining the various components described in the drawings and specification and by adding other elements within the spirit of the invention.

With respect to the present description, one of skill in the art will recognize that the optimal dimensional relationships for the elements of the invention, including variations in size, materials, shape, form, function and manner of operation, assembly and use, are readily apparent and equivalent relationships to those illustrated in the present description and drawings and are intended to be encompassed by the present invention. For example, a larger form of the lure according to the invention may be advantageous in the pursuit of larger fish such as lake bass or muskellunge, or fish living in saltwater habitats.

Figure 2:
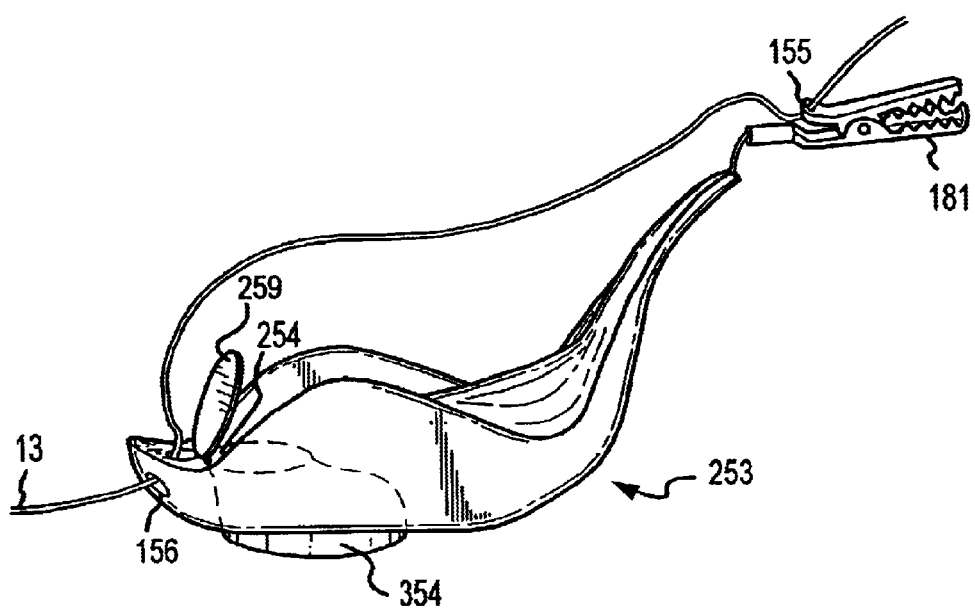
FIG. 2 is an oblique side view of a float according to the invention having a compartment for containing counterweights and a clip to which can be demountably attached a variety of fishing lures.

With reference to FIG. 1, fishing line 13 is threaded through a fishing line guide aperture 156 and attached to attractant 215 at attractant eyelet 219. Float 251 is provided with counterweight stalk 161 and counterweight 133. With reference to FIG. 2, float 253 is provided with weight chamber 354 having weight chamber lid 259 and weight chamber opening 254. Thus, one or more weights, such as lead shot or split shot, can be added to weight chamber 354 in order to control its relative stability and specific gravity while in use. Lure 253 of FIG. 2 also includes clips 181 having an aperture 155. Clip 181 is disposed for being attached to an attractant such as a dragonfly replica or other fish bait. Line 13, which is threaded through fishing line guide aperture 156 and aperture 155 on clip 181, is diposed for connetion to such an attractant.

Figure 3:
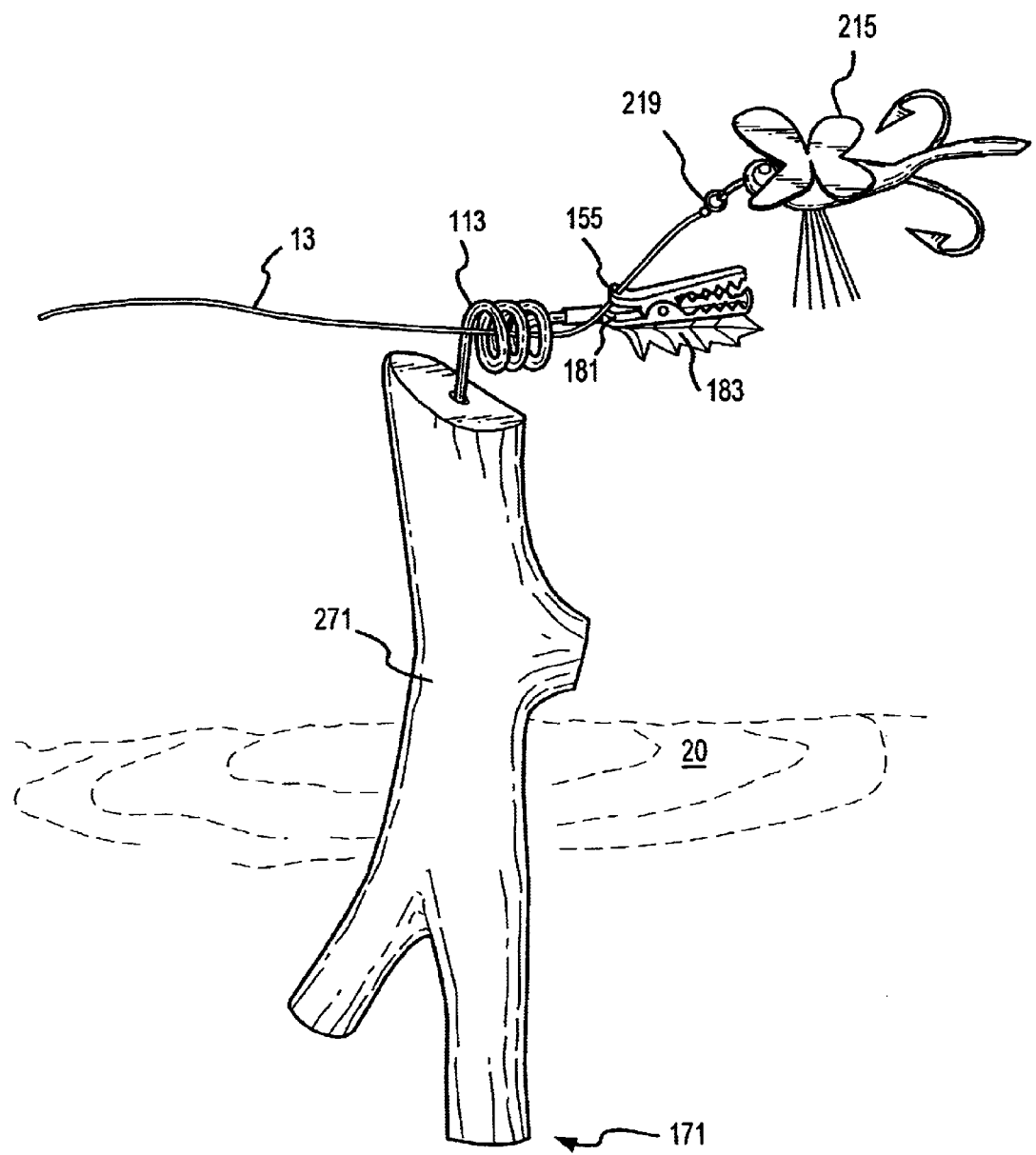
FIG. 3 is a side view of a float replicating a stick floating upright in water and comprising guides for a fishing line and a clip for demountably attaching live bait or another type of attractant.

FIG. 3 shows a floating stick embodiment of the invention. Float 171, which replicates a floating stick, comprises float body 271 spiral connector 113 and clip 181 which is fitted with leaf replica 183. In use, line 13 is threaded through spiral connector 113 and aperture 155 in clip 181 and then connected by tying or by means of a swivel as known in the fishing arts, to eyelet 219 of attractant 215. Attractant 251 can then be mounted by eyelet 219 in the jaws of clip 181.

Figure 4:
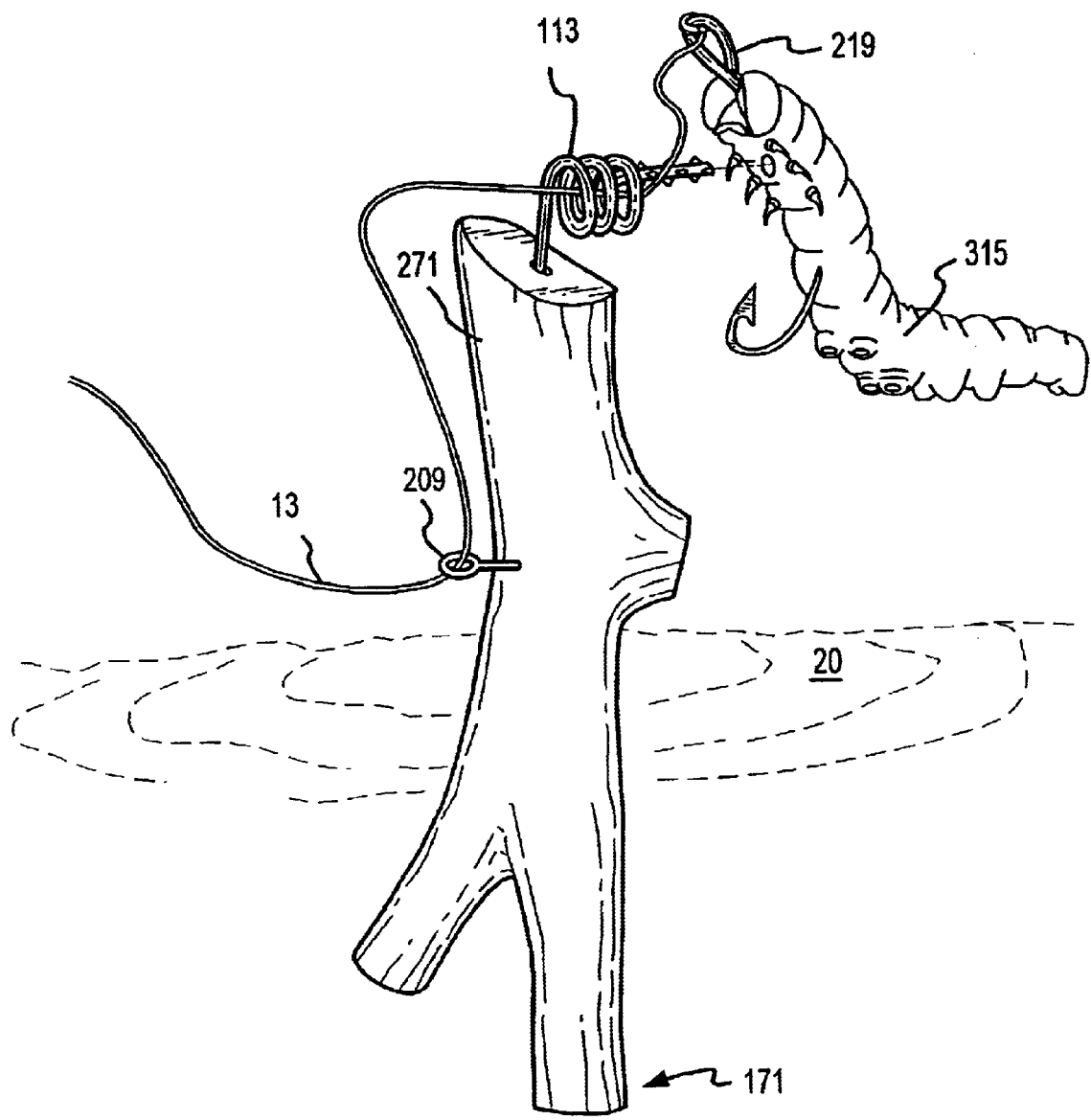
FIG. 4 shows a float similar to that in FIG. 3 but having a combined helical line guide and barbed bait/attractant impaler suitable for use with live bait such as the caterpillar attractant shown about to be impaled thereon.

With reference to FIG. 4, float 171 is provided with eyelet 209, and spiral attachment device 113 having sharp, barbed end 114 which is constructed and disposed for piercing live or artificial bait. In FIG. 4, artificial caterpillar 315 which is provided with hook 219 is shown in a position to be pierced by spiral connector 113. Line 13 is threaded through the several connectors and attached to eyelet 19 of attractant 315.

Figure 5:
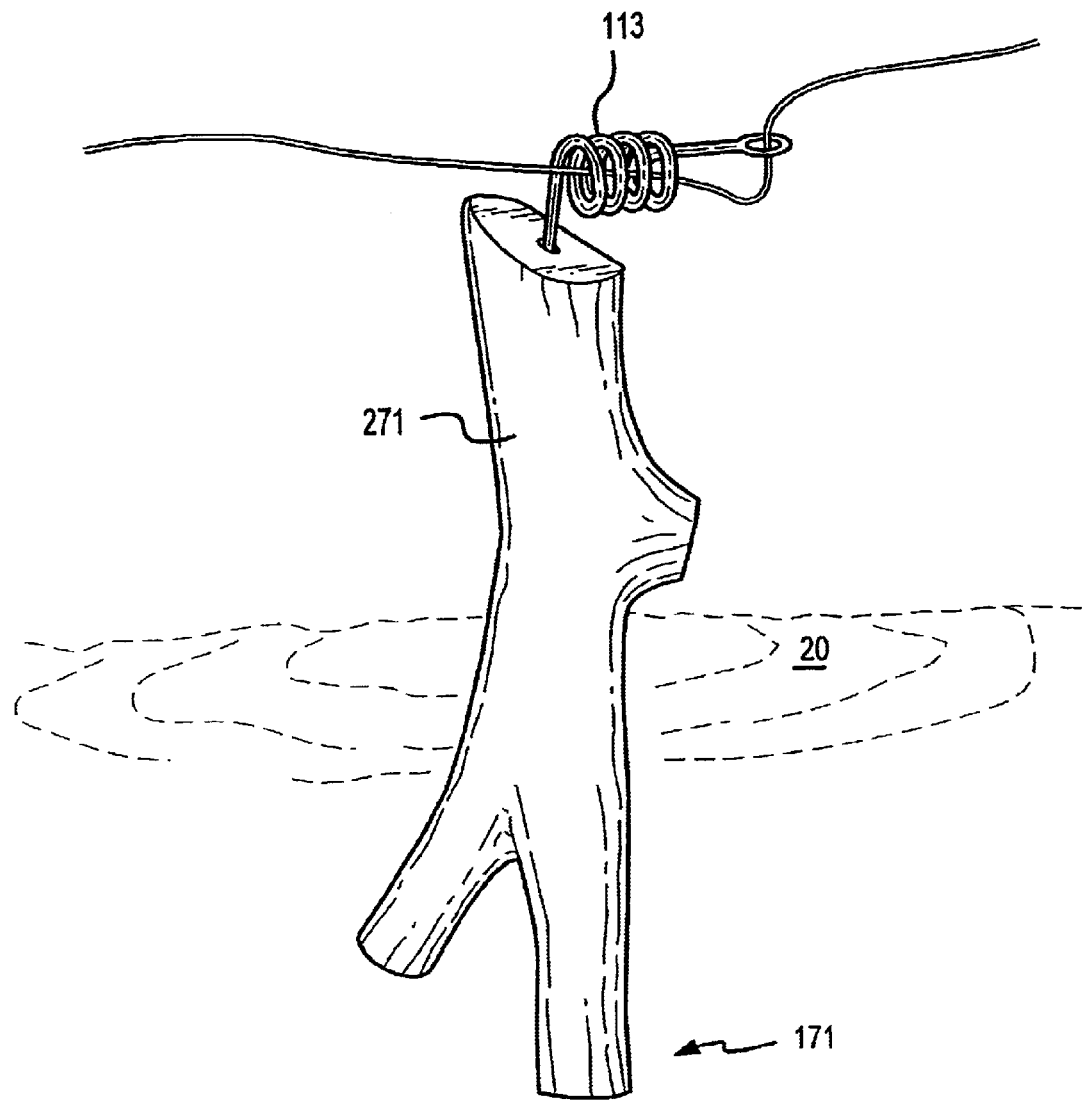
FIG. 5 is shows a float similar to that in FIG. 4 but having a combined helical line guide and eyelet for directing a fishing line to an attached attractant.
Figure 9:
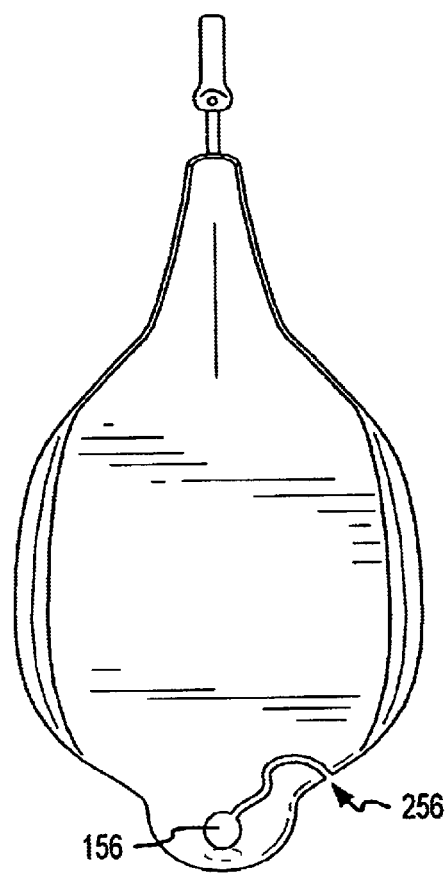
FIGS. 9 and 10 show a top and oblique side view respectively of a float replicating a leaf and being provided with an attractant clip and a fishing line guide aperture that is accessible from a side slot.
Figure 10:
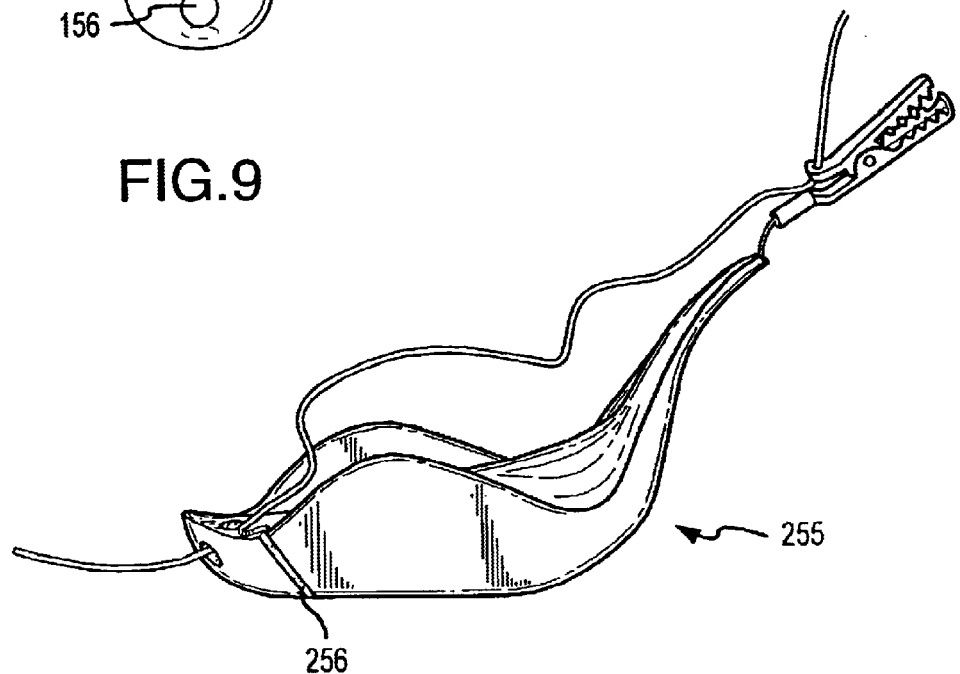

FIG. 5 shows float 171 disposed with spiral connector 113 comprising eyelet 117 for attachment of fishing line 13, an attractant, or both. FIG. 6 depicts an embodiment of the invention wherein float 281 replicates a floating clump of grass. Float 281 is provided with weight shaft 161 and counterweight 133 as well as clip 181 which is disposed to receive portion 219 of attractant 615. FIGS. 6 and 7 depict attractants for use with floats according to the invention. FIG. 9 is a bottom view of FIG. 10 which shows float 255 having fishing line guide aperture 156 and opening 256 for threading fishing line 13 therethrough.

Figure 11:
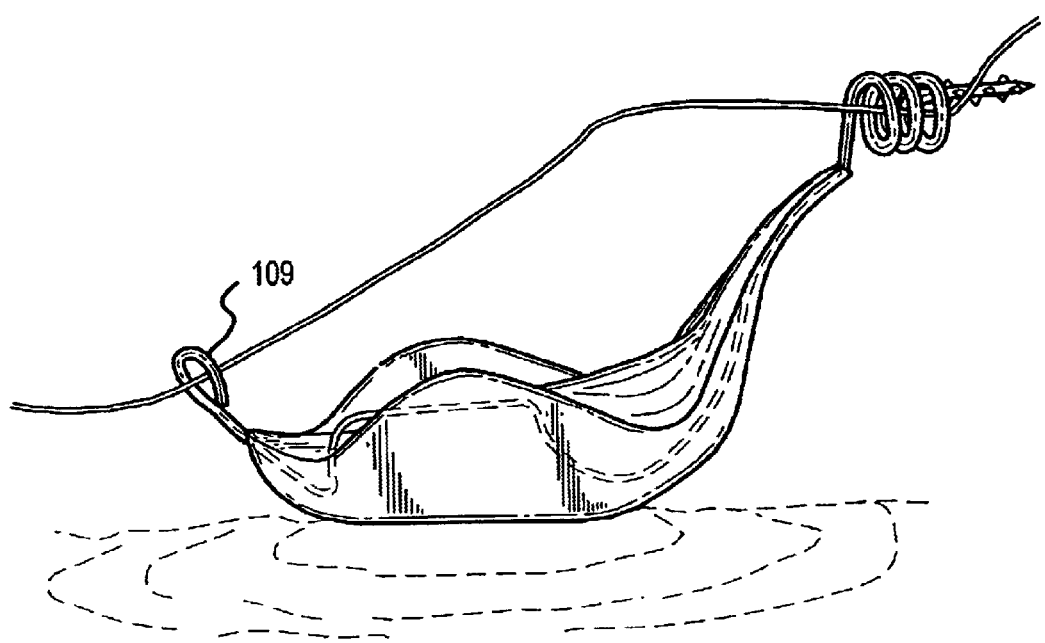
FIG. 11 shows an oblique side view of a float replicating a leaf floating in water and being provided with a helical line guide and barbed bait impaler.
Figure 12:
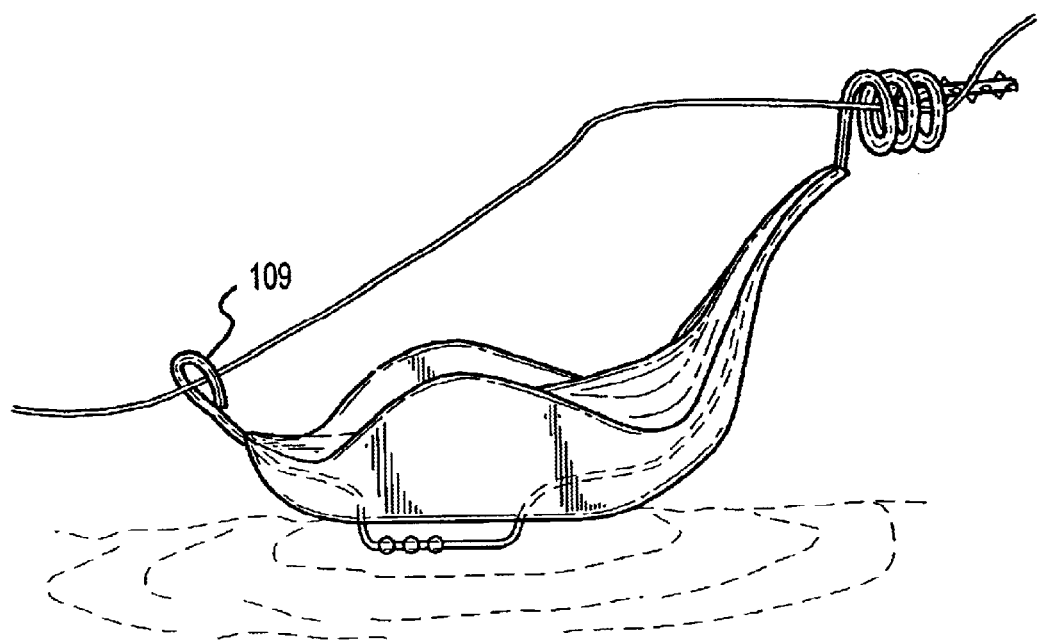
FIG. 12 shows a float similar to that in FIG. 11 but having a wire keel containing lead shot counterweights.
Figure 13:
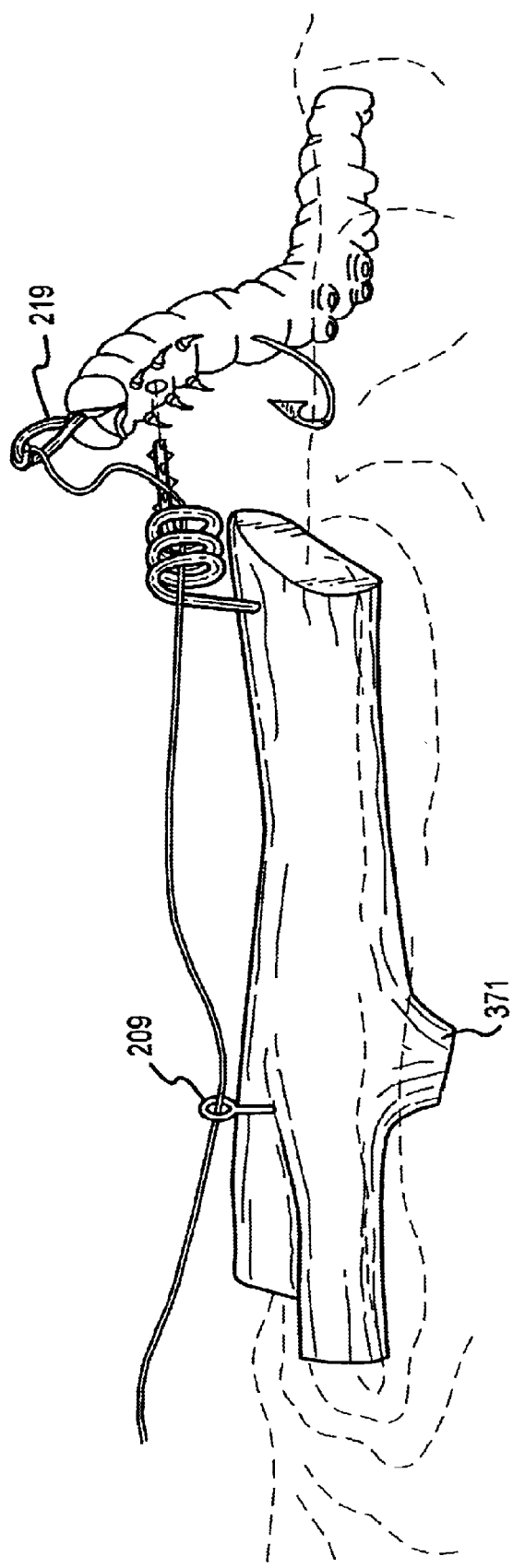
FIG. 13 shows a float replicating a stick floating on its side in water and having a combined helical line guide and barbed bait/attractant impaler suitable for use with live bait such as the caterpillar attractant shown. The attractant is shown in position to be impaled by the barbed guide and is partially in the water.

FIG. 11 shows an embodiment of the present invention wherein wire 109 is constructed and arranged both through and outside of the body of the float body to comprise an armature of the float body eyelet, an exposed wire for attaching weights thereto, and spiral connecting device 333 having barbed end 335. FIG. 12 depicts a float similar to that of FIG. 11 but wherein a portion of wire 109 extends below the bottom of the float and is disposed such that weights, such as split shot, can be attached thereto. FIG. 13 shows float 371, which replicates a horizontal stick floating in water. Float 371 is provided with eyelet 209, spiral attachment device 113 having a barbed extension 333 disposed for piercing a natural or artificial attractant, such as a caterpillar.

Figure 14:
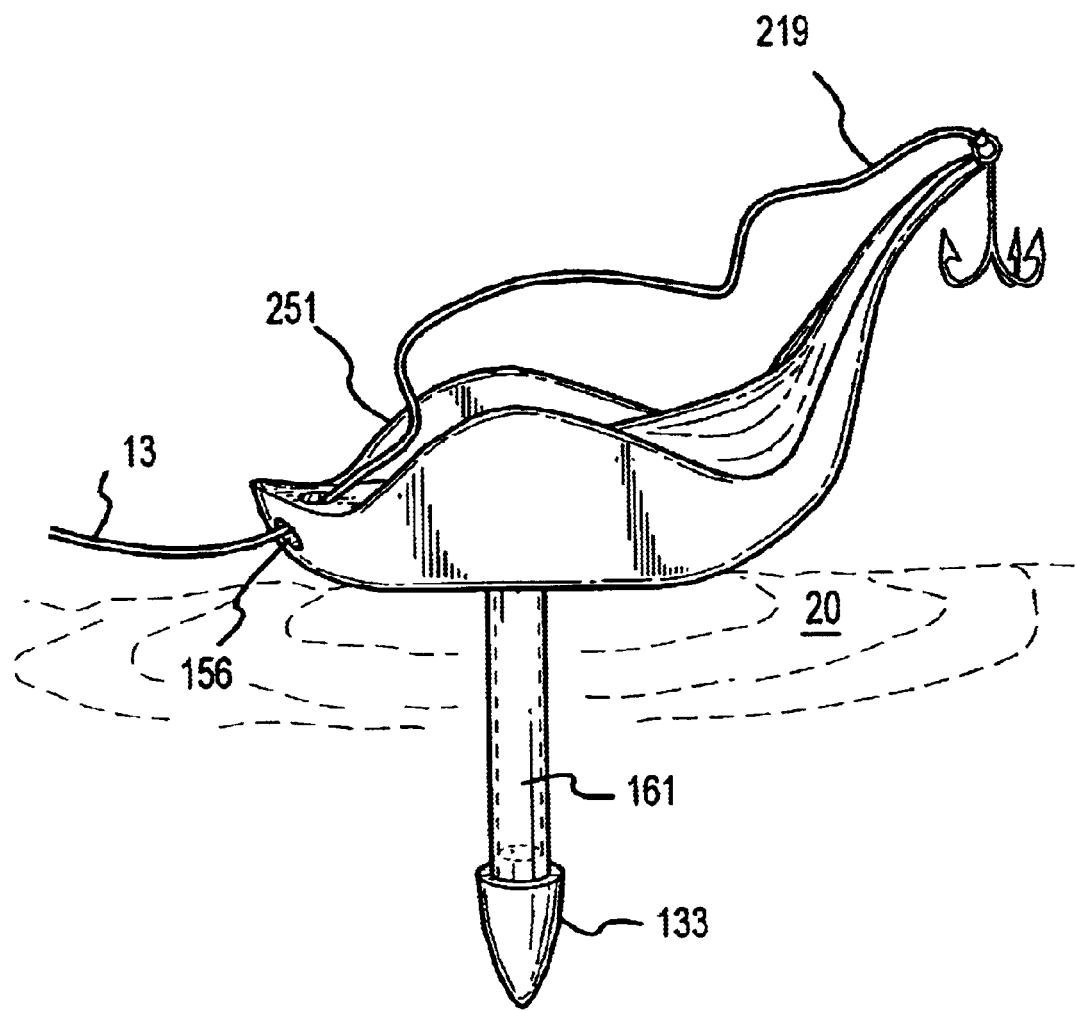
FIG. 14 shows an oblique side view of a float replicating a leaf and being provided with fishing line guides disposed for suspending a hook for attaching an attractant above water in which the float is borne.

FIG. 14 shows a float of the present invention replicating a leaf and having fishing line guide aperture 156 and eyelet 340. In use, line 13 is threaded through fishing line guide aperture 156 and eyelet 340 to be connected to eyelet 440 on hook 444. Line 13 moves relatively freely through both fishing line guide aperture 156 and eyelet 440 to connect, preferably by tying, to hook 443. Thus, the relative elevation of hook 443 with respect to water 20 is determined by the tension on line 13 as hook 443 hangs therefrom.

Figure 15:
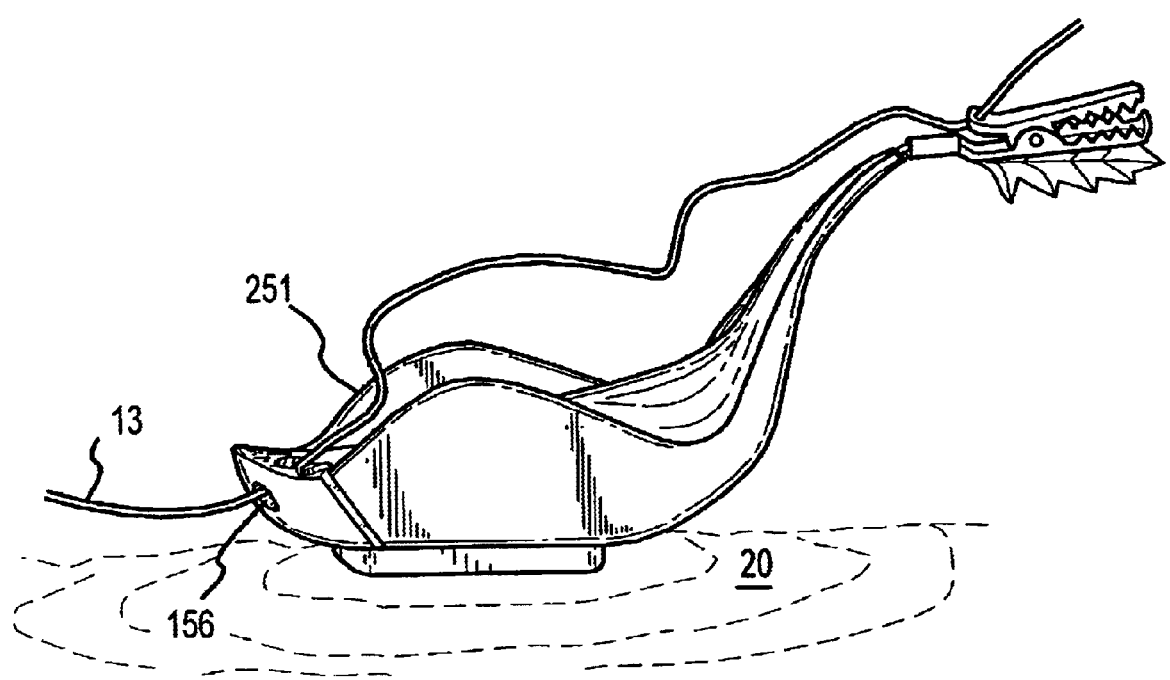
FIG. 15 shows a float similar to that of FIG. 14 and being provided with an attractant clip and a fishing line guide aperture that is accessible from a side slot.
Figure 16:
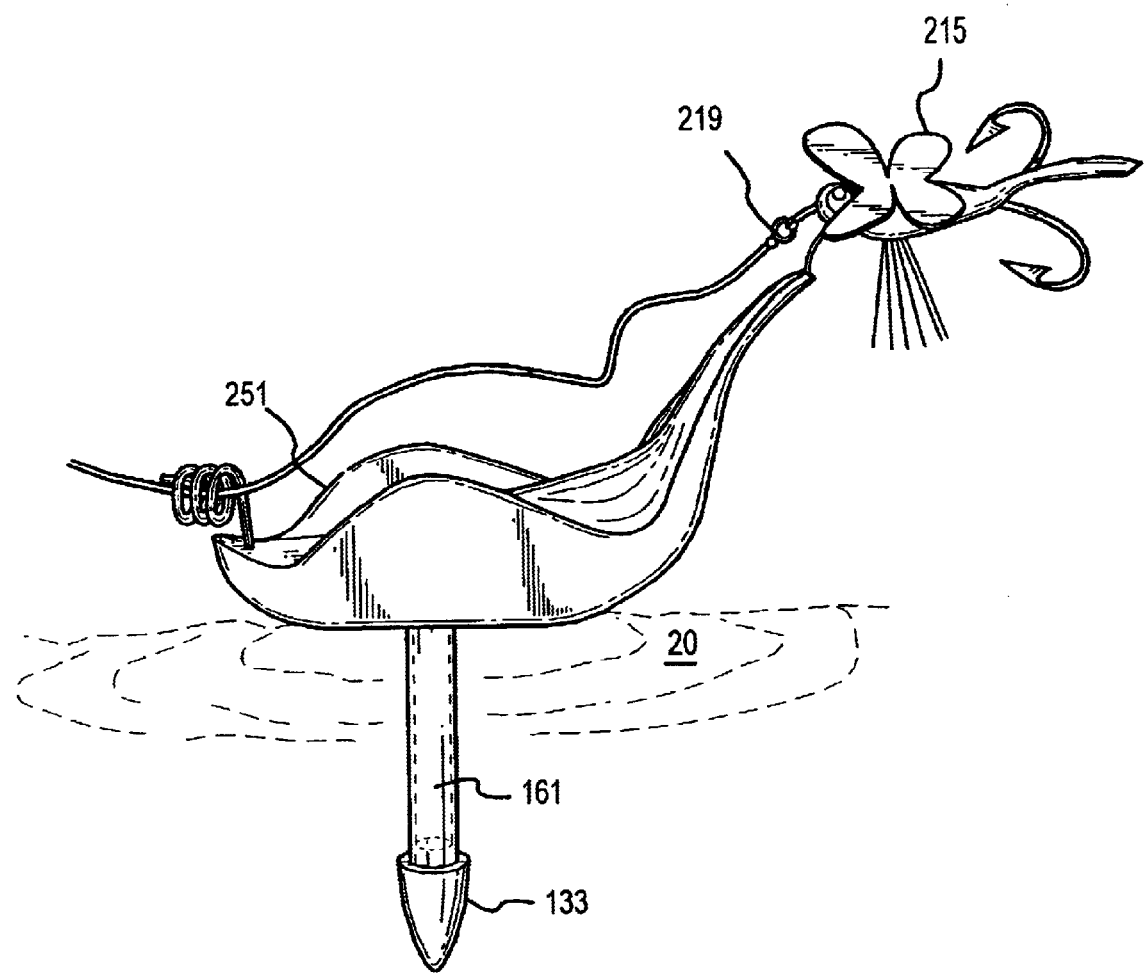
FIG. 16 shows an oblique side view of a float replicating a leaf and being provided with a helical fishing line guide and an attractant suspended above water in which the float is borne.
Figure 17:
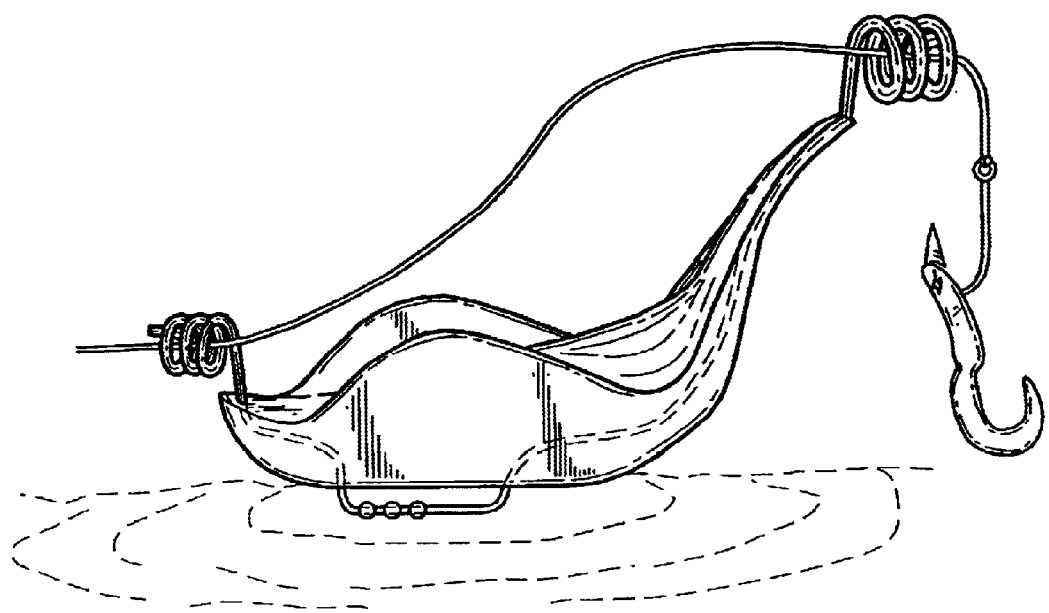
FIG. 17 shows an oblique side view of a float replicating a leaf and being provided with helical line guides disposed for suspending a hook and attached attractant above water in which the float is borne.

FIG. 15 shows an embodiment of the invention comprising weighted keel 293 disposed along its bottom. FIG. 16 shows an embodiment of the invention comprising spiral connector 319 disposed for receiving line 13 therethrough. FIG. 17 shows an embodiment similar to that shown in FIG. 12 but having spiral line guides 319 and 419 disposed at opposite ends of the float body. The relative height of the attractant over the water is thus controlled by the relative tension on line 13.

FIGS. 18–20 show permutations of non-scrobiculate floats that are suitable for use in practicing the present invention.

Figure 21:
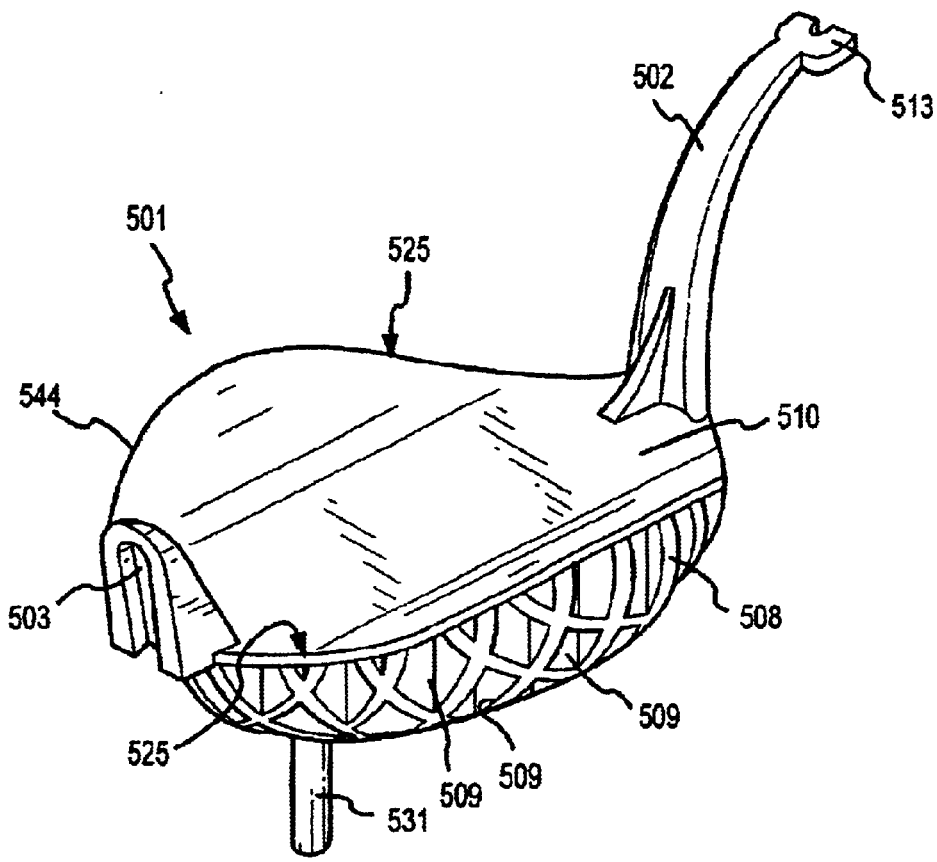
FIG. 21 shows a top oblique view of a scrobiculate, or channeled, float provided with channels that are square in cross-section, replicating a leaf and being provided with an eyelet line guide and a stem, or connector, disposed for attachment to an attractant such that the attractant can be suspended at least partly above water in which the float is borne.

FIG. 21 shows a scrobiculate, or channeled, lure according to the invention having float body 544 that replicates a leaf or a portion thereof. Float body 44 having outer margin 525 and upper surface 510 is provided with eyelet 503 and stem 502 having attractant attachment tab 513 disposed at the end of stem 502. Float body 544 is provided also with a plurality of elongated channels 509 that are approximately rectangular in cross section. Elongated rectangular channels 509 are shown each with their respective top ends, disposed near the upper surface closed closed ends at the top of open ends. Some embodiments of the invention, however, channels 509 can be closed. Leaf float 501 is also provided with counterweight stalk 531 for attachment of a counterweight (not shown) of sufficient mass to keep the float upright in an aqueous fluid.

Figure 22:
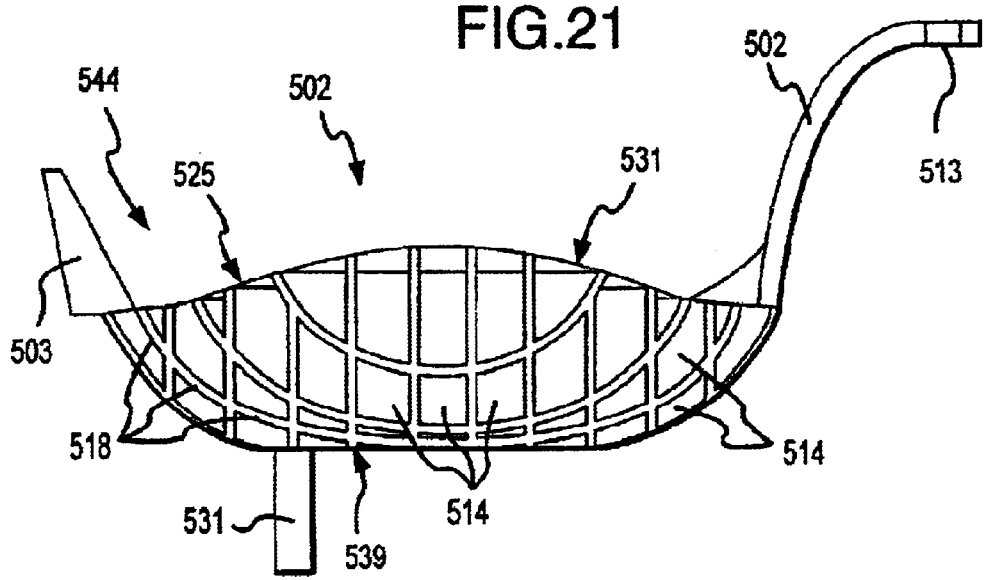
FIG. 22 shows a top oblique view of a scrobiculate, or channeled, float similar to that of FIG. 21 but provided with channels that are rectangular in cross-section.
Figure 23:
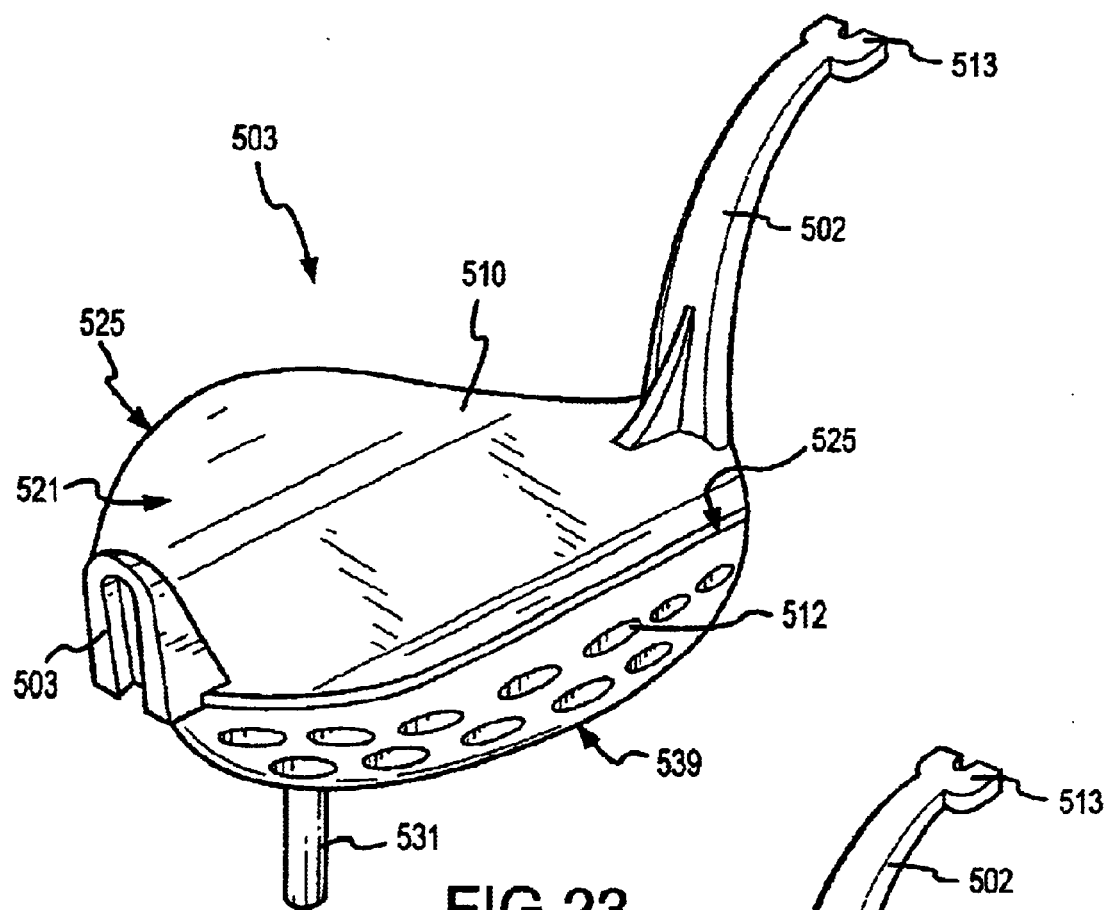
FIG. 23 shows a top oblique view of a channeled float according to the invention wherein the channels are ovoid in cross-section.
Figure 24:
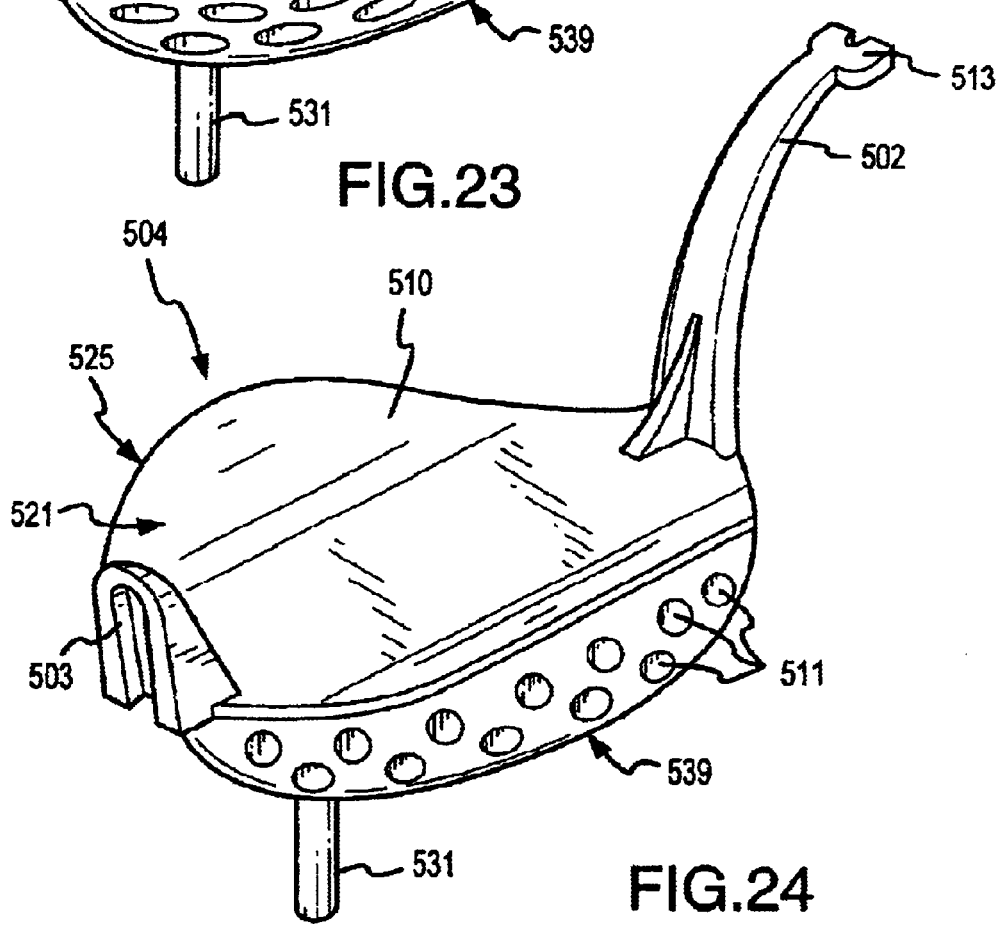
FIG. 24 shows a top oblique view of a channeled float according to the invention wherein the channels are substantially circular in cross-section.

FIG. 22 is a side view of a float similar to, but not identical to, float 501 shown in FIG. 21 except that channels 514 are approximately square in cross-section. Bottom boundary or water-contacting surface 539 of float 502 is formed by the furthest reaches of the walls 508 that form channels 509 and 514. FIG. 23 shows float 503 having float body 521 and channels 512 that are oval in cross section disposed within float body 521. Float 503 is provided with counterweight stalk 531 that extends from bottom boundary 539 to provide a means for attaching a counterweight (not shown) of sufficient mass to keep the float upright in an aqueous fluid. FIG. 24 shows float 504, which is similar in design to float 503 except that channels 511 are round in cross section instead of oval.

Figure 25:
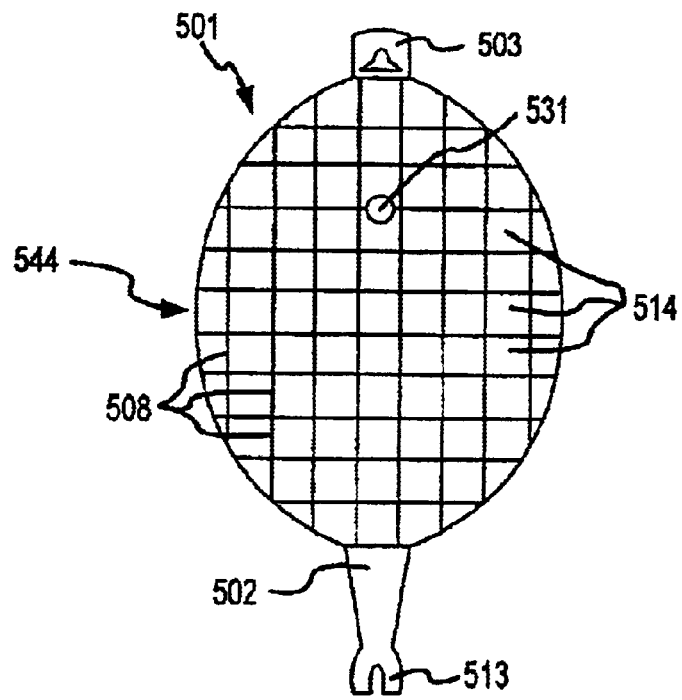
FIG. 25 shows a bottom view of the channeled float of FIG. 22.
Figure 26:
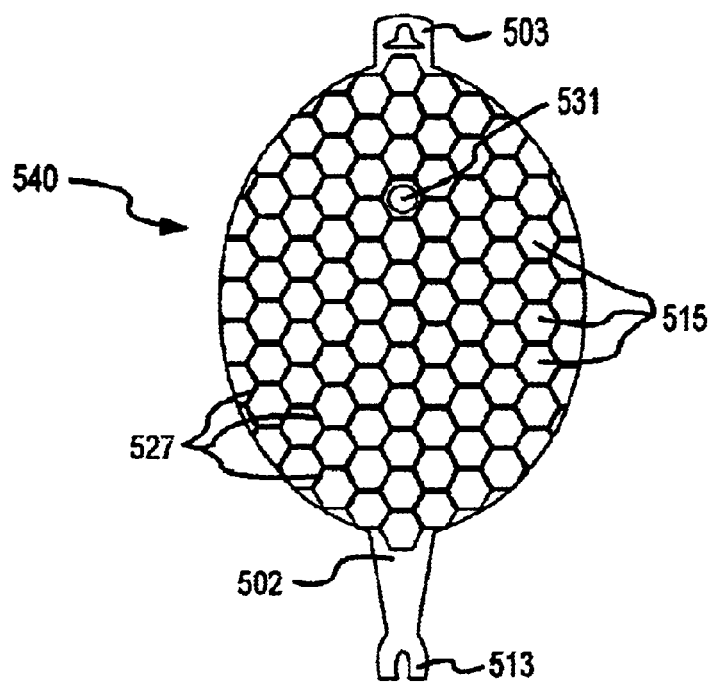
FIG. 26 shows a bottom view of a channeled float similar to that shown in FIG. 22 but having channels that are hexagonal in cross-section.
Figure 27:
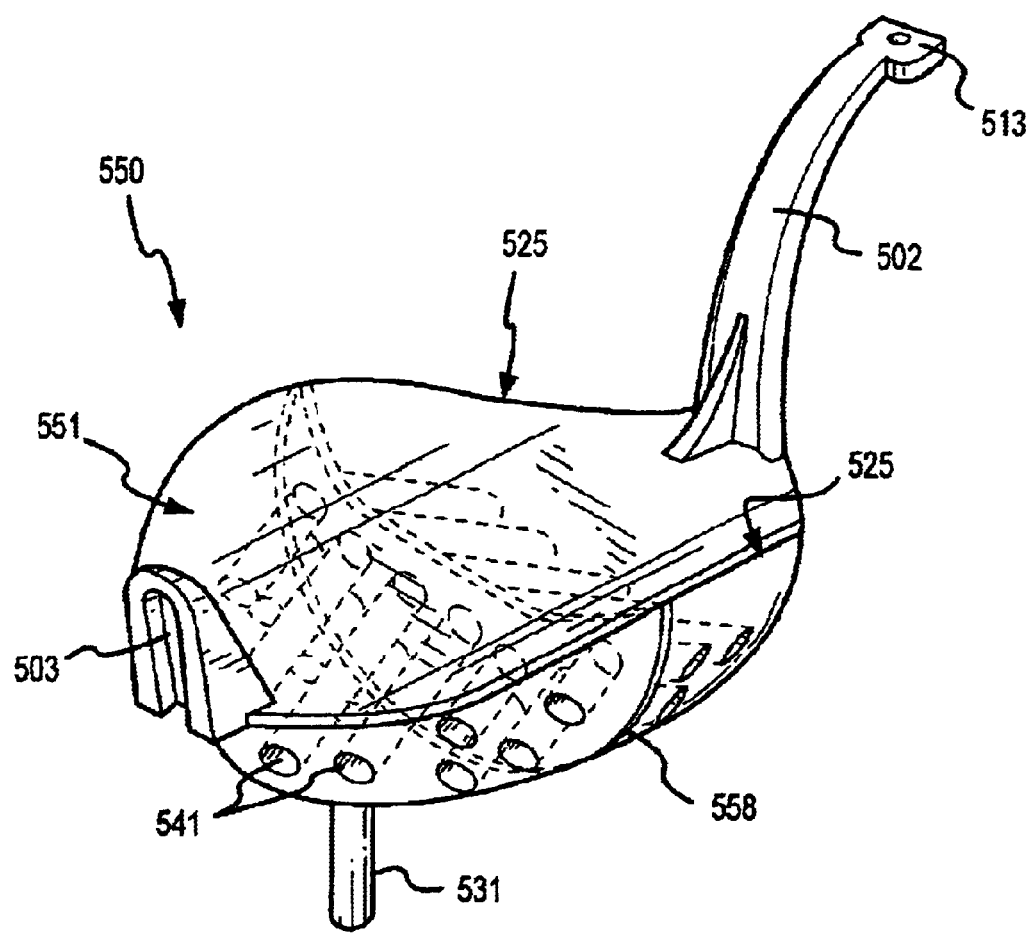
FIG. 27 shows a top oblique view of a channeled float according to the invention wherein the channels are substantially circular in cross-section and slant from the water-contacting surface to terminate at a wall provided in a medial portion of the float.

FIG. 25 shows a bottom plan view of float 501 of FIG. 21 where walls 508 form square channels 514 and counterweight stalk 531 extends from float body 544 for attaching a counterweight (not shown) of sufficient mass to keep the float upright in an aqueous fluid. FIG. 26 shows a bottom plan view of a float similar to float 501, but wherein walls 527 form hexagonal channels 515. FIG. 27 is a side oblique view of float 550 having float body 551 outer margins 525, stem 502, attracrant attachment tab 513 and eyelet 503. Float body 551 of float 550 is provided with a plurality of slanted channels 541 that slant to terminate at center wall 558.

Figure 28:
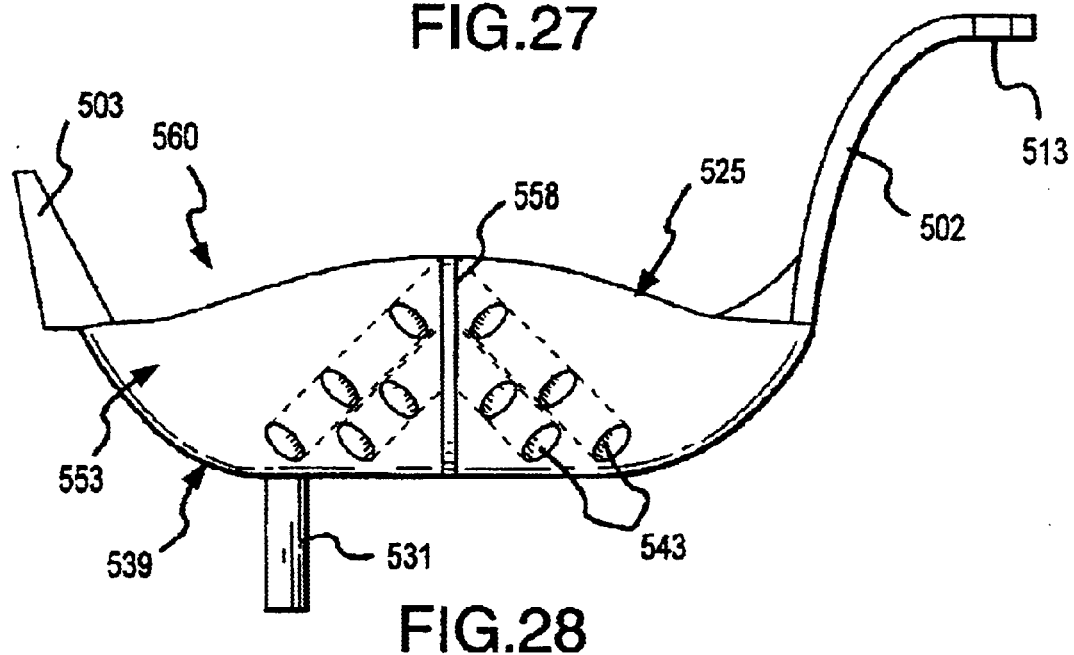
FIG. 28 is a side view of the channeled float shown in FIG. 27.
Figure 29:
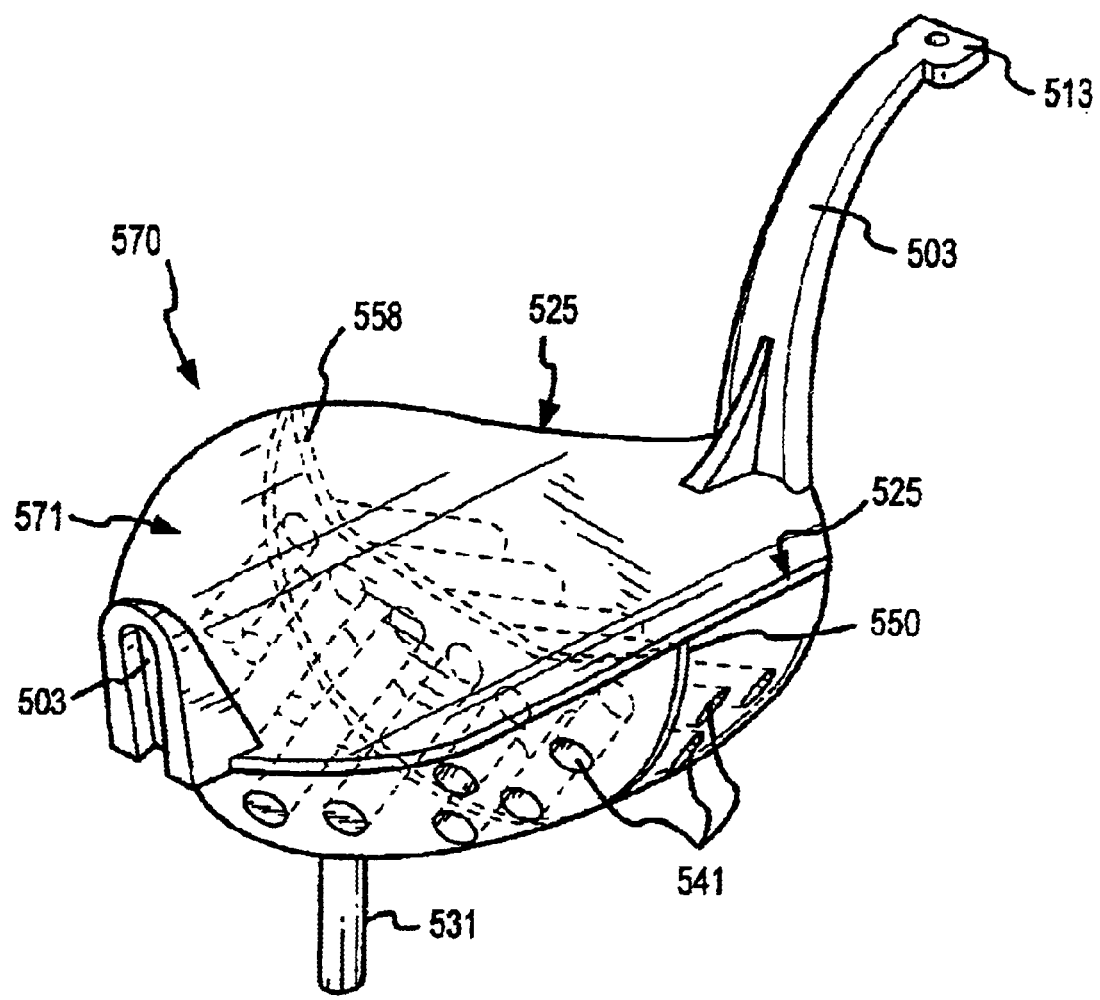
FIG. 29 is a top oblique view of a channeled float similar to that in FIG. 27 but having a greater number of channels, and the channels are substantially ovoid in cross-section.

FIG. 28 shows float 560 which is similar to float 550 shown in FIG. 27 except that float body 553 of 560 is provided with slanted channels of 543 that are oval in cross section and end at center wall 558. Similar to other leaf replicating floats described herein, float 560 is provided with outer margins 525 bottom boundary 539. Counterweight attachment stalk 531 (counterweight not shown) eyelet 503 stalk 502 and attachment tab 513 for attaching an attractant such as a naturally occuring bait made or an artificial lure thereto.

Figure 30:
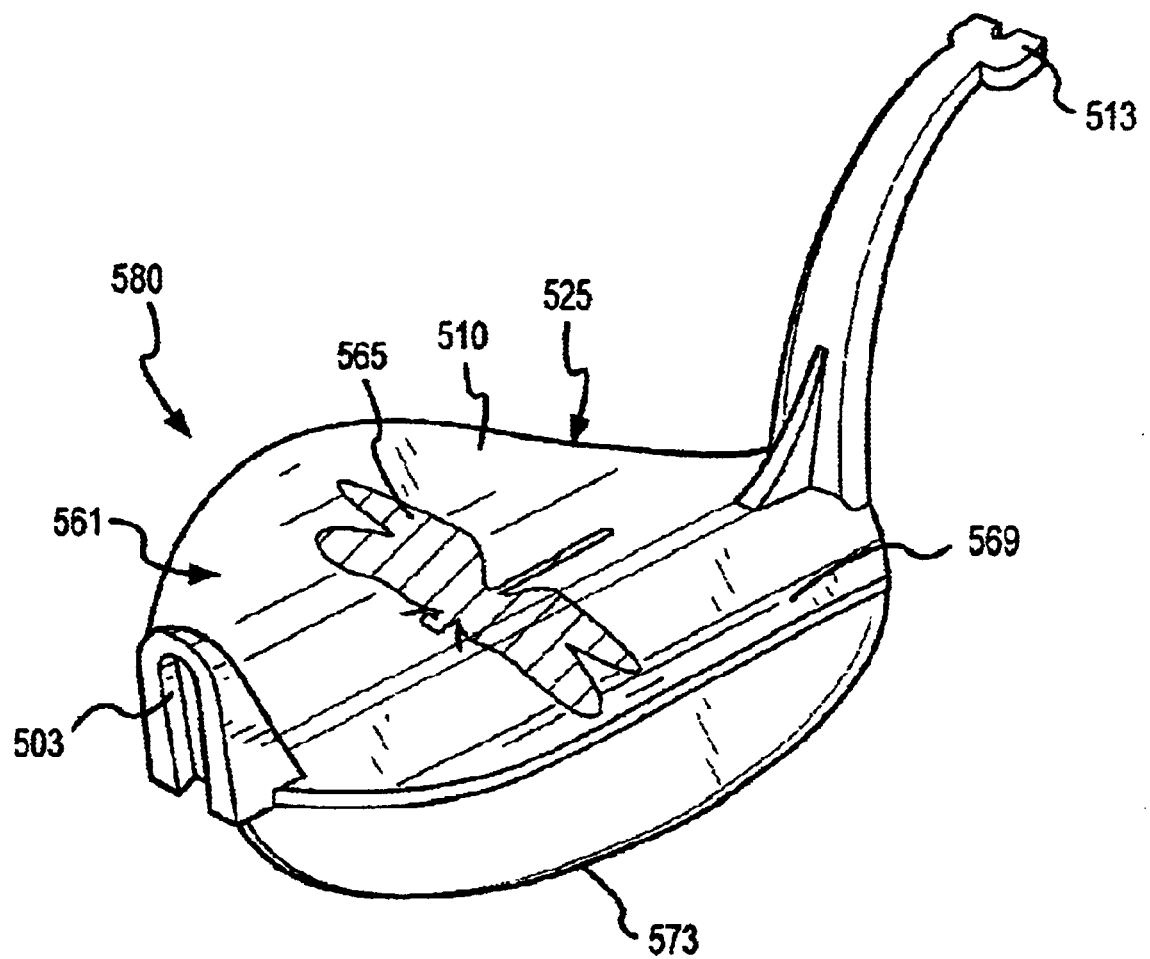
FIG. 30 is a top oblique view of a transparent or translucent float according to the invention provided with the phantom shadow of an attractant.

FIG. 30 is an oblique view of float 580 having float body 561 and weighted keel 573 attached thereto. Float body 561 includes upper surface 510 having embossed or printed thereon a false shadow 565 of an attractant such as, for example, a dragonfly. Float body 561 is preferably made of a translucent material such as polyethylene or polypropylene. Weighted keel 573 may comprise attachment points or attachment ridges for the attachment of weights such as split shot (not shown).

Figure 31:
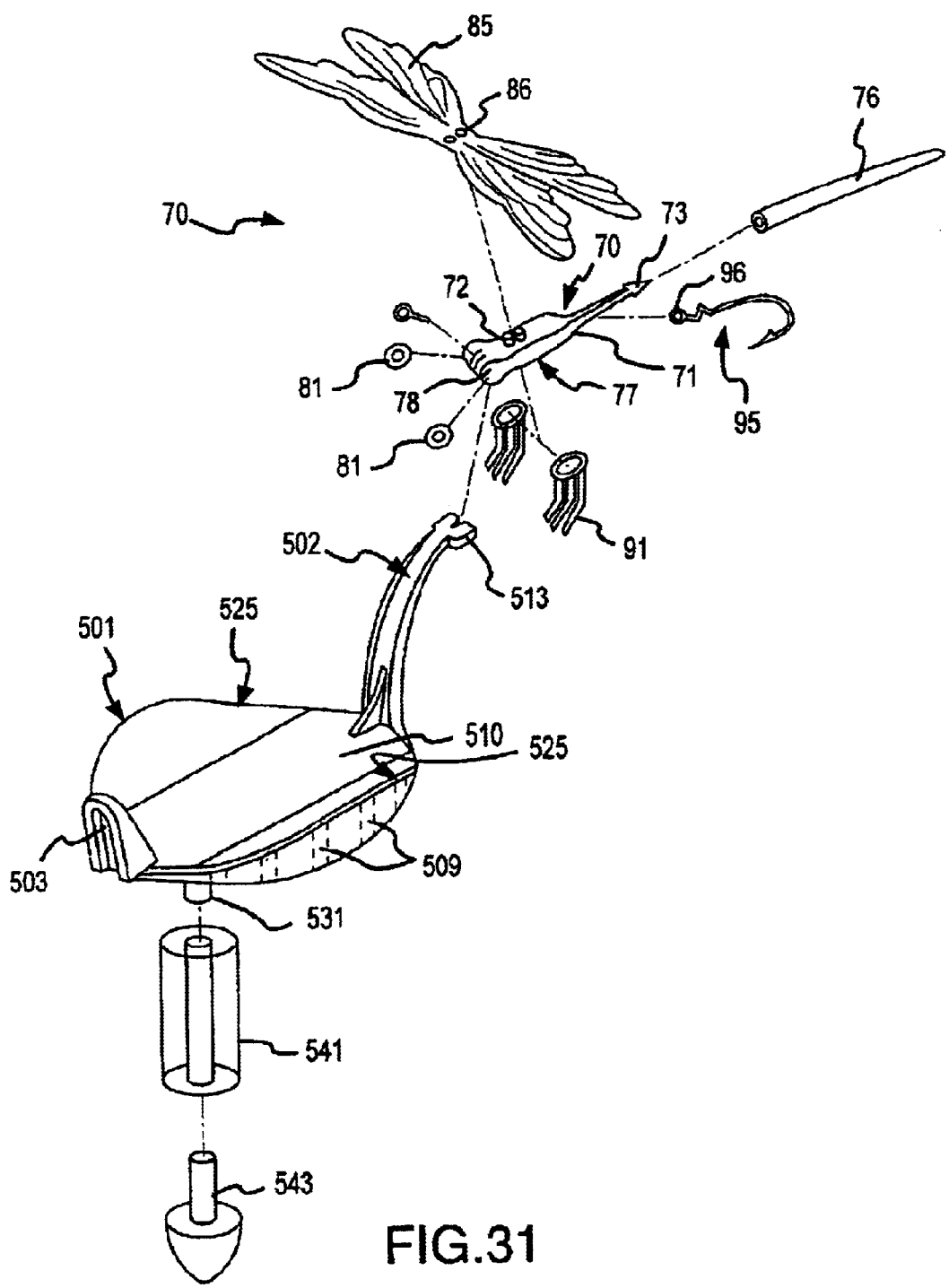
FIG. 31 is an exploded view of one example of a kit embodiment of the invention showing exemplary parts an artificial dragonfly attractant attached to a scrobiculate float having a mushroom-shaped counterweight.
Figure 32:
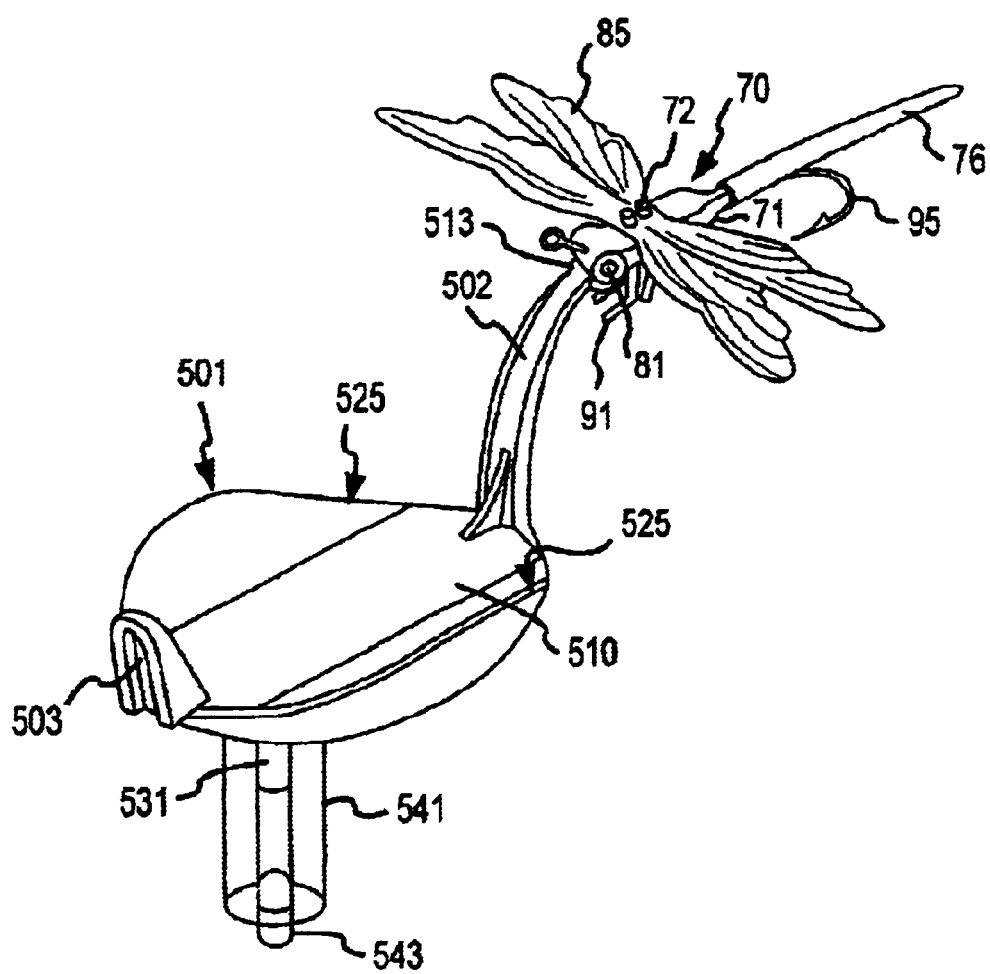
FIG. 32 shows the invention of FIG. 31 in assembled form and provided with a cylindrical counterweight.

FIG. 31 is an exploded view of one example of a kit embodiment of the invention showing an artificial dragonfly attractant attached to a float. The kit of FIG. 31 is shown assembled in FIG. 32. FIGS. 31 and 32 show artificial dragonfly 70 having thorax 71 provided with attachment barb 73 for attaching tail 76 to thorax 71. Thorax 71 is provided also with hook slot 94 (shown in FIG. 33) for attaching dragonfly attractant 70 to hook 95. Thorax 71 is provided also with mouth slot 97 for attaching dragonfly 70 to scrobiculate float 501 at attractant attachment tab 513 on adjustably flexible stem 502 of float 501. Rotation-resistant hook 95 is provided with hook eyelet 96 for attaching hook 95 to a fishing line (not shown) that has been threaded through eyelet 503 of float 501. Dragonfly 70 is also provided with wings 85 having wing attachment apertures 86 which are disposed for connecting wings 85 to thorax 71 by means of attachment posts 72 on the top surface of thorax 71. Thorax 71 is provided also with eye-mounting surfaces 78 for mounting eyes 81 on thorax 71. Thorax 71 is provided also with leg attachment surfaces 79 disposed on opposite sides of thorax 71 for attachment of leg sets 91. In use, the various elements of dragonfly 70 are assembled to form a complete dragonfly of a chosen combination of elements.

Thus, a user may select one type of wing, one type of thorax, one type of tail, one or two types of eyes and one or two types of leg sets to assemble a specific type of lure. This aspect of the invention is particularly advantageous since it permits a fisherman to assemble a lure that is seasonably appropriate or specific to one or more varities of dragonfly and to one or more target fish species. Assembled, dragonfly 70 can be attached to float 501 by means of attractant attachment tab 513 or by other means such as a clip (not shown), and then used to attract and catch fish. One preferred method of using the many possible float/attractant combinations of the invention is to thread a fishing line through eyelet 503 of float 501 and attach the fishing line to rotation-resistant hook 95 disposed in thorax 71. In the embodiment shown in FIGS. 31 and 32, float 501 is provided with counterweight stalk 531 and tubing 541 for suspending lead counterweight 543 disposed at least partially within tubing 541 at a distance appropriate to keep float 501 upright in water thus suspending dragonfly 70 at a desired position above, or partly above, the surface of the water in which the attractant and float combination is cast, thrown or placed. FIG. 32 shows dragonfly 70 and float 501 of in their assembled state.

Figure 33:
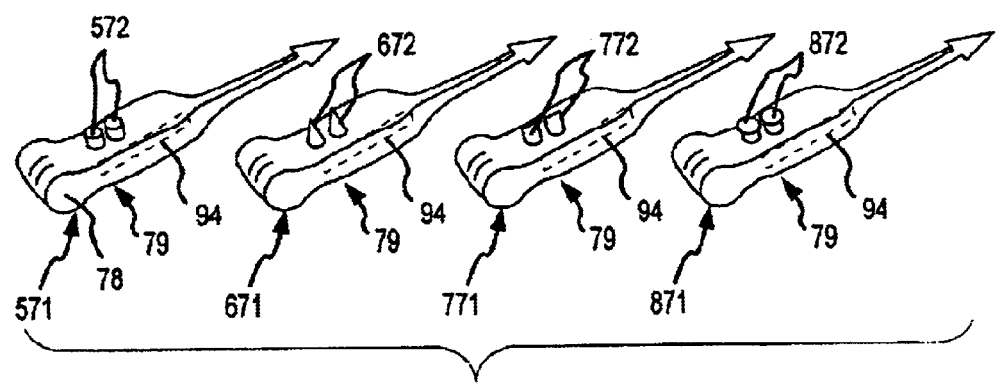
FIG. 33 shows examples of thorax element variations of the kit form of the invention.

By combining the variations of the several elements of the kit form of the invention, many different permutations of the dragonfly attractant are provided. As is shown in FIG. 33, for example, variations of thorax 71 are possible. While only four variations are shown, numerous others are within the scope and spirit of the present invention. Within the scope of the invention, each element of the dragonfly attractant has numerous permutations with respect to, for example, size, color, texture, odor, flexibility, plasticity, elasticity, density, degree of reflectiveness, degree of movability, and degree of motion while being subject to vibration, among other characteristics.

Although, for example, while thorax 571 has wing attachment posts 572, and thorax 671 has wing attachment cones 672, and thorax 771 has wing attachment slots 772, thorax 871 has mushroom tabs 872 all of which are provided for attaching one or more variations of wings 85 to thorax 71. Thorax 71 can be provided with co-molded eyes and legs. Alternatively, as is shown in FIGS. 31–33, thorax 71 can be provided with eye-mounting surfaces 78 and leg-mounting surfaces 79 so that many permutations of the lure can be assembled from a relatively small variety of specific body elements. Thorax 571 is provided also with slot 94 for receiving rotation-resistant hook 95. Thus, hook 95 can be attached to an attractant such as a dragonfly, by insertion into a slot provided in a thoray or other body part of the artificial attractant while also being attached to a fishing line by means of eyelet 96.

Figure 34A:
FIGS. 34a–c shows examples of tail element variations of the kit form of the invention.
Figure 34B:
Figure 34C:

FIG. 34 shows several permutations of tails 76 of the invention. While all versions of tail 76 are provided with mounting holes 78 for connecting tail 76 to thorax 71 by way of tail-mounting barb 73 provided on thorax 76, variations of tails 76 afford the permutational advantages discussed herein. FIG. 34(a) shows tail 676 having an upward or downward bend, FIG. 34(a) shows tail 776 having a right or left sideways bend, while FIG. 34(c) shows tail 876 in a substantially straight confirmation. The scope and spirit of the present invention encompass all variations of the body parts of any attractant whether it is a dragonfly, grasshopper, worm, beetle, salamander or any other type of fish bait or attractant.

Figure 35:
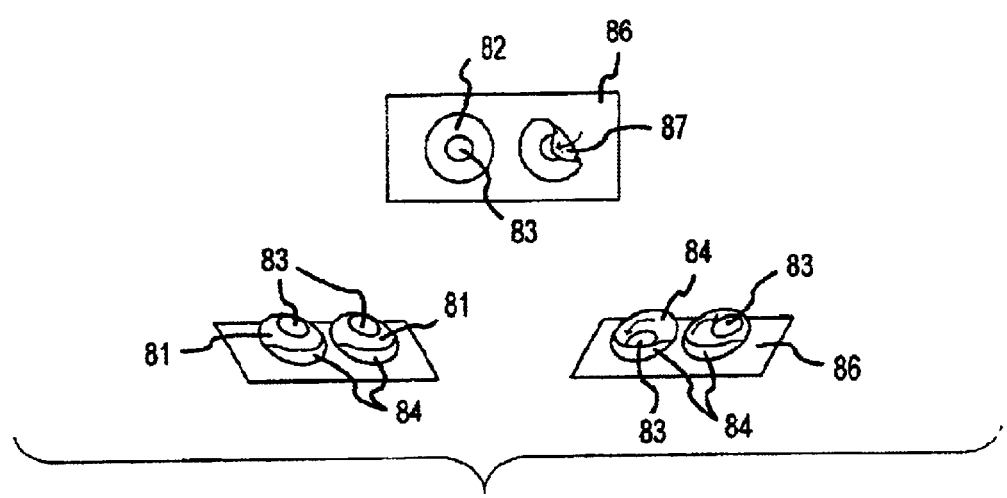
FIG. 35 shows examples of eye element variations of the kit form of the invention.

FIG. 35 shows a number of permutations of eyes 81 of the invention, including iris 81, movable element 83 and shading or eyelid 84. In some embodiments of the eye elements of kit forms of the invention, the back sides of eyes 81 are provided with adhesive 87 and mounted on slip sheet 86. Thus, in use, eyes 81 can be peelably removed from slip sheet 86 and mounted in eye mounting surfaces 78 of thorax 71.

Figure 36A:
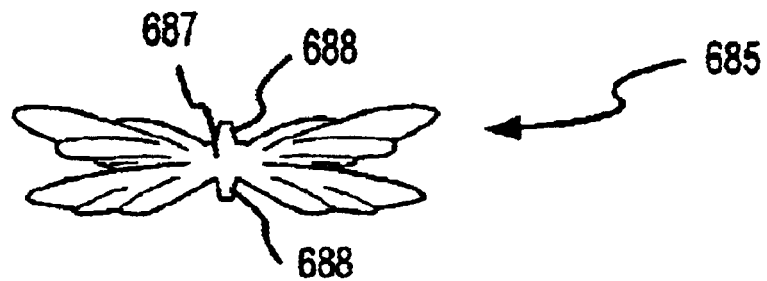
FIGS. 36a–c show examples of wing element variations of the kit form of the invention.
Figure 36B:
Figure 36C:
Figure 37A:
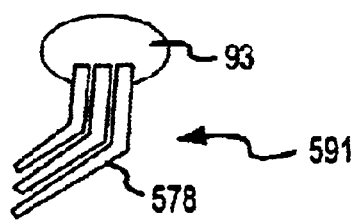
FIGS. 37a–e show examples of leg element variations of the kit form of the invention.
Figure 37B:
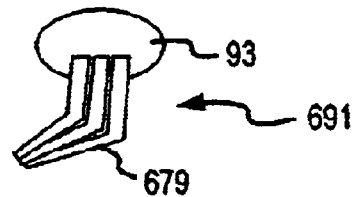
Figure 37C:
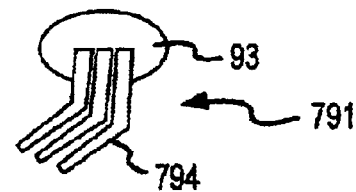
Figure 37D:
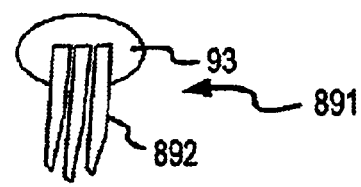
Figure 37E:
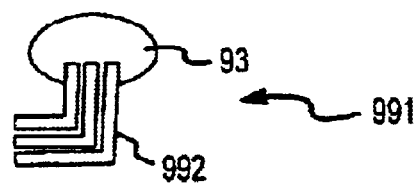

FIG. 36 shows a number of permutations of wings 85 of the invention. FIG. 36(a) shows wings 685 provided with tabs 688 and adhesive surface 687. Tabs 688 are disposed for insertion into slots 772 of thorax 771 (shown in FIG. 33). Adhesive surface 687 of FIG. 36(a) is provided so that adhesive, such as a silicone or other water-resistant adhesive (not shown) can be used to assist in the attachment of wing 685 to thorax component 71 of one or more of the kit forms of the invention. FIG. 36(b) shows wings 785 provided with wine attachment apertures 86 for attaching the wings to one or more permutations of thorax 71, for example, permutations 571, 671 or 871 shown in FIG. 33. FIG. 36(c) shows wings 885 provided with post 801 disposed for insertion into slot 772 of thorax 771.

FIG. 37 shows a number of permutations of leg sets according to the invention. The essential potions of the legs are thigh portions and shin portions. For example, FIG. 37(a) shows bent leg set 591 having thigh portion 578 and shin portion 579 attached to leg-mount element 93. Leg mount element 93 is constructed and arranged so that its shape corresponds to mounting surface 79 on thorax permutations 71. Leg mount element 93 can be provided with an adhesive, if desired, or snap-fit elements complementary to elements that may be provided on thorax 71 (not shown). FIG. 37(b) shows leg set 691 having converging shins 679 while FIG. 37(c) shows leg set 791 having parallel shins 779. FIG. 37(b) shows leg set 891 comprising straight legs 892 attached to leg mount element 93. FIG. 37(b) shows leg set 991 having legs 992 arranged into a grasping position and attached to leg-mount element 93.

Figure 38A:
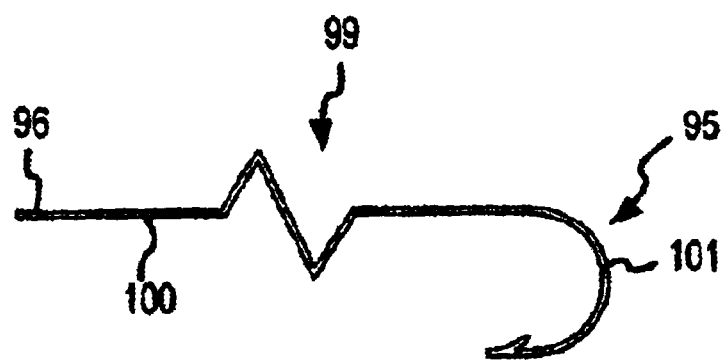
FIGS. 38a–c show one embodiment of a rotation-resistant hook according to the invention and suitable for use with attractants comprising a complementary slot.
Figure 38B:
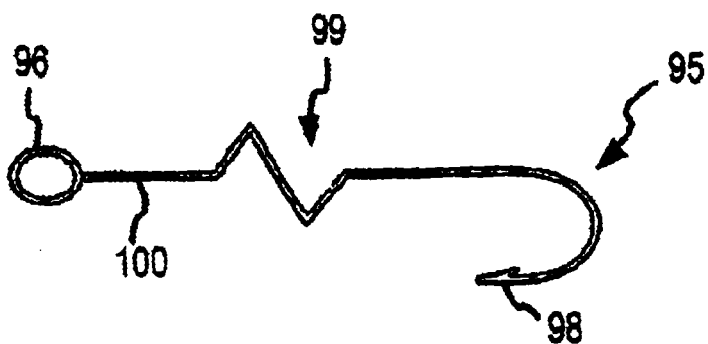
Figure 38C:
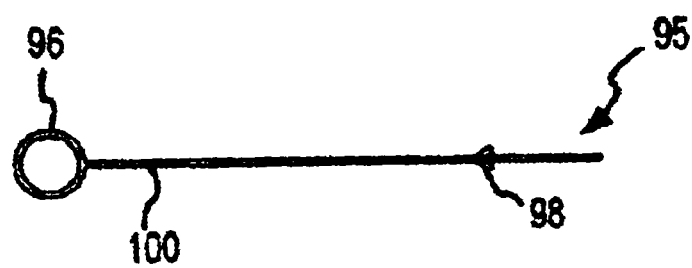

FIGS. 38a–c show one embodiment of a rotation-resistant hook 95 according to the invention. FIG. 38(a) is a side view of rotation-resistant hook 95 having eyelet 96 disposed for attaching the hook to a fishing line or clip, shaft 100, comprising Z-shaped bend 99, curved portion 101, point 103 and barb 105. Shaft 100, having Z-shaped bend 99, curved portion 101, point 103 and barb 105 are disposed substantially in one plane. FIG. 38(b) is an oblique side view of the rotation-resistant hook 95 of FIG. 38(a) showing the corresponding elements as well as the opening of eyelet 96. FIG. 38(c) is a top view of rotation-resistant hook 95 shown in FIG. 38(a) and showing the opening of eyelet 96, and barb 98 extending slightly outward from the plane in which shaft 100, Z-shaped bend 99, curved portion 101, and point 103 are disposed. Thus, when hook 95 is engaged in a slot, such as slot 94 of thorax 71, the hook and attractant will not rotate, or will rotate very little relative to one another, and thus provide positional stability for the hook/attractant combination. As one of skin in the fishing lure art will comprehend, rotation-resistant hook 95 can be adapted to numerous other uses, particularly with respect to its combination with fishing lures.

As one of skill in the art will understand, the present invention is not limited in its application to the details of construction and to the arrangements of the components set forth in the following description and drawings. The invention is capable of various other embodiments and of being practiced and carried out in various ways. One of skill in the art will also understand that the terminology and phraseology employed herein to describe the present invention are illustrative and not limiting.

In this regard, those skilled in the art will appreciate that the concept upon which the present invention is based may readily be utilized as a basis for the designing of other structures, methods, and configurations for carrying out the several purposes of the present invention. Accordingly, it is important that the claims be regarded as including such equivalent instructions insofar as they do not depart from the spirit and scope of the present invention.

What is claimed is:

1. A scrobiculate float for use with a fishing attractant or lure, said float comprising:

A. a float body, said float body comprising
   I. an upper surface, said upper surface being bordered by an outer margin,
   II. a water-contacting surface comprising at least one arc, at least part of said water-contacting surface being disposed opposite said upper surface,
   III. a plurality of channels extending from said water-contacting surface toward said upper surface and constructed and arranged such that said channels trap air when said float is placed in water, and IV. a keel or stalk disposed in said float in proximity to said bottom margin, said keel or stalk comprising a counterweight;

B. a connector extending from said float for connecting said float to an attractant or lure, said connector being constructed and arranged such that said attractant or lure is held at least partially above water in which said float is borne;

C. an eyelet or fishing line guide aperture for receiving a fishing line disposed in proximity to said upper surface and substantially opposite to said connector;

D. means comprising an aperture within said attractant or lure for receiving said fishing line wherein said fishing line is fixed to said attractant or lure;

E. said attractant or lure is demountably attached to said connector; and

F. said connector for connecting said float to said attractant comprises a press-fit member and said attractant comprises a slot corresponding to said press-fit member.

* * * * *